United States Patent [19]
Brumley et al.

[11] Patent Number: 5,926,775
[45] Date of Patent: Jul. 20, 1999

[54] MINI DRIVER SOFTWARE ARCHITECTURE FOR A DATA ACQUISITION SYSTEM

[75] Inventors: Jonathan Brumley, Austin; Neil Feiereisel, Cedar Park, both of Tex.

[73] Assignee: National Instruments Corporation, Austin, Tex.

[21] Appl. No.: 08/946,804

[22] Filed: Oct. 8, 1997

[51] Int. Cl.⁶ .................................................. G06F 17/40
[52] U.S. Cl. ........................... 702/127; 709/301; 710/15
[58] Field of Search .................................. 702/127, 188;
364/138, 178, 188, 194, 468.15; 395/680,
681, 682, 683, 685, 828, 830, 835; 709/300,
301, 302; 710/15

[56] References Cited

U.S. PATENT DOCUMENTS

| | | | |
|---|---|---|---|
| 5,319,751 | 6/1994 | Garney | 395/200 |
| 5,404,494 | 4/1995 | Garney | 395/500 |
| 5,497,500 | 3/1996 | Rogers et al. | 395/800 |
| 5,604,843 | 2/1997 | Shaw et al. | 395/101 |
| 5,627,998 | 5/1997 | Mondrik et al. | 395/500 |
| 5,724,272 | 3/1998 | Mitchell et al. | 364/579 |
| 5,752,032 | 5/1998 | Keller et al. | 395/681 |
| 5,764,546 | 6/1998 | Bryant et al. | 364/580 |
| 5,784,275 | 7/1998 | Sojoodi et al. | 364/191 |
| 5,847,953 | 12/1998 | Sojoodi et al. | 364/88 |

*Primary Examiner*—John Barlow
*Assistant Examiner*—Patrick Assouad
*Attorney, Agent, or Firm*—Conley, Rose & Tayon; Jeffrey C. Hood

[57] ABSTRACT

An improved software architecture for data acquisition (DAQ) driver level software executing in a DAQ system. The DAQ driver level software receives calls from the DAQ user application and is executable to control the DAQ device. The DAQ driver level software includes one or more interpreters which receives calls from the DAQ user application. Each of the interpreters performs functionality which is common for a plurality of DAQ devices, and each of the interpreters is preferably useable for a plurality of different DAQ devices. The DAQ driver level software also includes a plurality of mini-driver primitives which each perform a portion of controlling the DAQ device, i.e., each controls a hardware resource of the DAQ device. In the preferred embodiment, each of the mini-driver primitives present the same application programming interface. The present invention thus comprises an improved architecture for DAQ driver level software. The software architecture of the present invention thus provides much greater code reuse and simplification of individual board drivers.

48 Claims, 16 Drawing Sheets

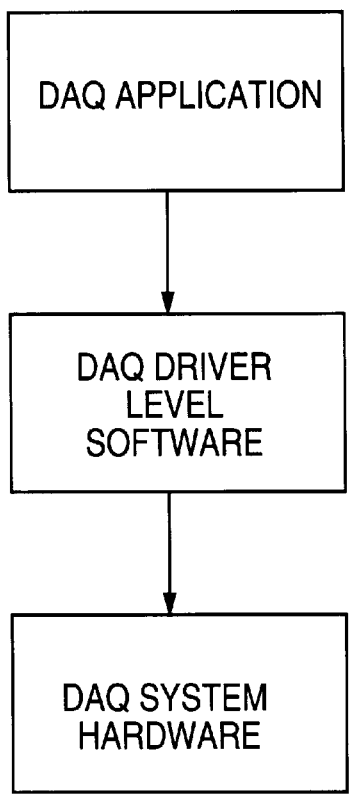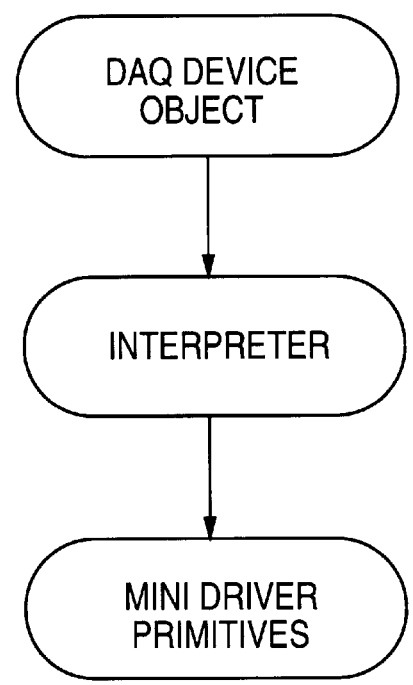
Fig. 2
Fig. 3

WFM ENGINE STATE DIAGRAM

MINI-DRIVER & THE BUFFER OBJECT

MINI DRIVER SOFTWARE ARCHITECTURE FOR A DATA ACQUISITION SYSTEM

BACKGROUND OF THE INVENTION

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

1. Field of the Invention

The present invention relates to data acquisition (DAQ) systems, and particularly to an improved modular software architecture for a data acquisition system which provides code development simplification and increased code reuse.

2. Description of the Related Art

Scientists and engineers often use DAQ systems to perform a variety of functions, including laboratory research, process monitoring and control, data logging, analytical chemistry, test and analysis of physical phenomena, and control of mechanical or electrical machinery, to name a few examples. A DAQ system typically includes transducers and other detecting means for providing "field" electrical signals representing a process, physical phenomena, equipment being monitored or measured, etc. For example, detectors and/or sensors are used to sense the on/off state of power circuits, proximity switches, push-button switches, thermostats, relays or even the presence of positive or negative digital logic-level signals.

A typical DAQ system comprises a computer system with DAQ hardware, wherein the DAQ hardware is typically plugged into one of the I/O slots of the computer system. The field signals are provided to the DAQ hardware. In another common DAQ system configuration, the DAQ hardware is coupled to the computer system via other means such as through a VXI (VME extensions for Instrumentation) bus, a GPIB (General Purpose Interface Bus), a serial port, or parallel port of the computer system. Optionally, the DAQ hardware comprises signal conditioning modules which receive the field signals and condition the signals to be acquired.

The DAQ hardware is configured and controlled by DAQ software executing on the computer system. The DAQ software for configuring and controlling the DAQ system typically comprises two portions: the device interface or driver level software and the application software, or the application. The driver level software serves to interface the DAQ hardware to the application. The driver level software is typically supplied by the manufacturer of the DAQ hardware or by some other third party software vendor. The application is typically developed by the user of the DAQ system and is tailored to the particular function which the user intends the DAQ system to perform. The DAQ hardware manufacturer or third party software vendor sometimes supplies the application software for some applications which are common, generic or straightforward.

DAQ driver level software provides a high-level interface to the operations of the DAQ device. The DAQ driver level software operates to configure the DAQ device for communication and initialize hardware and software to a known state. The DAQ driver level software also generally maintains a soft copy of the state of the DAQ device and initiated operations. Further, the DAQ driver level software communicates over the bus to move the device from state to state and to respond to device requests.

Prior art DAQ driver level software, such as NI-DAQ version 4.0 from National Instruments, maintains a state for devices in a common set of data structures, wherein different data structures are used for different device functionality, such as analog input (AI), analog output (AO), digital I/O (DIO), etc. This prior art DAQ driver level software typically used arrays of data structures for replicated hardware primitives and also intermixed hardware programming and parameter validation. Further, the high-level functions were mostly generic, with device-specific cases singled out within the function.

Therefore, the current software architecture for DAQ driver level software, such as NI-DAQ from National Instruments, is centered around a legacy C application programming interface (API). In this current DAQ driver level software architecture, generic or hardware independent functionality was required to be implemented repeatedly for each board, and thus there was needless repetition of code. With the proliferation of device types, the amount of DAQ driver level software grew fairly large, with little re-use of code between devices.

Another complicating factor in the design of DAQ driver level software is access from multiple processes. In general, the DAQ driver level software must maintain a consistent state of the device across processes. One short-term solution is to allocate data structures from shared memory. In addition, the DAQ driver level software must allow safe multi-threaded access.

Another complicating factor in the design of DAQ driver level software includes user-mode/kernel-mode issues. In general, I/O access is speedier when using software executing in kernel mode. However, various issues arise for software executing in kernel mode. First, interrupts must be serviced from the kernel. Also, memory access levels are different, and file I/O and floating point operations are not recommended in the context of a kernel environment. In prior art DAQ driver level software, such as NI-DAQ 4.0 executing under Windows 95 and Windows 3.1, all foreground I/O was performed from user mode. The DAQ driver level software responded to device interrupts in kernel mode, and was required to map data required by the interrupt service routine (ISR) to user mode and kernel mode. The DAQ driver level software further utilized cumbersome, tricky techniques to handle user mode/kernel mode transitions. In NI-DAQ 4.0 executing under Windows NT, all foreground I/O and ISRs executed in kernel mode. Also, the data structures which maintained the device state were accessible only from the kernel environment. Further, the high-level functions perform floating-point (scaling) or file access to the configuration file in user mode.

It would be highly desirable for the DAQ driver level software architecture to allow for greater code reuse and simplification. In addition, it would be desirable for DAQ driver level software to provide more efficient user mode/kernel mode operation.

Therefore, an improved DAQ driver level software architecture is desired for controlling and/or accessing functionality of a DAQ device.

SUMMARY OF THE INVENTION

The present invention provides an improved software architecture for data acquisition (DAQ) driver level software executing in a DAQ system. Broadly speaking, the data acquisition system comprises a computer system coupled to a data acquisition device, a data acquisition application (user application) executing on the computer system, and driver level or device interface software according to the present invention executing on the computer system which enables the data acquisition application to perform steps to control the data acquisition device.

The DAQ driver level software receives calls from the DAQ user application and is executable to control the DAQ device. The DAQ driver level software includes one or more interpreters which receives calls from the DAQ user application. Each of the interpreters performs functionality which is common for a plurality of DAQ devices or operations involving floating point or file I/O, which are restricted in the kernel environment. Such operations include setting up data acquisition for buffered operation, messaging which does not require board programming, setting up SCXI and AMUX attachments to the device, performing parameter validation on incoming function parameters, scaling to engineering units, and hardware database access, among others. Each of the interpreters is preferably useable for a plurality of different DAQ devices.

The DAQ driver level software also includes a plurality of mini-driver primitives. Each of the mini-driver primitives performs a portion of controlling the DAQ device. In other words, the DAQ device includes a plurality of hardware resources for performing DAQ functions, and each of the plurality of mini-driver primitives controls one of the hardware resources. For example, where the plurality of hardware resources on the DAQ board include an analog input, an analog output, a digital port, a waveform generator, and a counter, the plurality of mini-driver primitives include an analog input primitive, an analog output channel primitive, a digital port primitive, a waveform engine primitive, and a counter engine primitive. Each of the plurality of mini-driver primitives are specific to the DAQ device. Also, each of the plurality of mini-driver primitives performs operations to control the DAQ device in response to calls received from the interpreter, which are in response to a call from the DAQ user application. In the preferred embodiment, each of the mini-driver primitives presents the same application programming interface.

The DAQ driver level software also preferably includes a DAQ device object. The DAQ device object is created when the DAQ driver level software is loaded into the computer system, and the DAQ device object corresponds to the DAQ device. The DAQ device object creates a mini-driver which in turn creates each of the plurality of mini-driver primitives. The DAQ device object also creates each of the interpreters. The DAQ device object is created from a device class based on the type of DAQ device comprised in the DAQ system. Each of the mini-driver primitives are also created from a primitive base class.

A method for controlling a data acquisition (DAQ) device in a DAQ system according to the present invention comprises a DAQ user application first generating a call to perform data acquisition operations in the DAQ system. The call is preferably provided to the DAQ device object and then forwarded to an appropriate interpreter, based on the type of call. The interpreter receives the call from the DAQ user application and performs various DAQ driver level functions in response thereto. As noted above, the interpreter performs functionality which is common for a plurality of DAQ devices. The interpreter then generates calls to a plurality of mini-driver primitives in response to receiving the call from the DAQ user application. The plurality of mini-driver primitives each perform a portion of controlling the DAQ device, i.e., each of the plurality of mini-driver primitives perform operations to control specific resources of the DAQ device.

In the preferred embodiment, the interpreter executes in user mode of the computer system, and the mini-driver primitives execute in kernel mode. This provides improved efficiency for execution of the primitive code, while avoiding file I/O and floating point operations in the kernel.

The present invention thus comprises an improved architecture for DAQ driver level software. The DAQ driver level software of the present invention includes a lower level mini-driver and a plurality of mini-driver primitives for each device or family of devices. Each family of DAQ devices, such as DAQ interface boards, defines the hardware resources or primitives which are available, as well as the programming attributes defined for those primitives or resources. The primitive interface thus provides a lower level interface to different operations or resources on the DAQ device. A driver family interpreter executes on top of the mini-driver primitives. The interpreter operates to configure device family independent or hardware independent features for each device. The interpreter can also operate to convert from a legacy user interface to the low level programming interface provided by the respective mini-driver primitives.

The software architecture of the present invention thus provides much greater code reuse and simplification of individual board drivers. This reduces development time to develop new drivers, since new drivers must only implement the core primitive interfaces, while an existing interpreter can be re-used. The software architecture of the present invention also provides an interpreter which operates in user mode and mini-driver primitives which operate in kernel mode, thus providing increased efficiency.

BRIEF DESCRIPTION OF THE DRAWINGS

A better understanding of the present invention can be obtained when the following detailed description of the preferred embodiment is considered in conjunction with the following drawings, in which:

FIG. 2 illustrates the software/hardware hierarchy of the DAQ system of FIG. 1;

FIG. 3 is a block diagram illustrating the hierarchy of software components or objects in the DAQ driver level software;

DETAILED DESCRIPTION OF THE PREFERRED EMBODIMENT

Incorporation by Reference

U.S. patent application Ser. No. 08/943,784 titled "Configuration Manager for Configuring a Data Acquisition System" filed Oct. 3, 1997, (Docket 5150–17500) whose inventors are Meg Fletcher Kay, Jonathan Brumley, Howard Tsoi, and Kurt Carlson, is hereby incorporated by reference as though fully and completely set forth herein.

U.S. patent application Ser. No. 08/711,128 titled "Attribute-Based System and Method for Configuring and Controlling a Data Acquisition Task" filed Sep. 9, 1996, (Docket 5150–15700) whose inventors are Tim Hayles and James Bednar, is hereby incorporated by reference as though fully and completely set forth herein.

U.S. patent application Ser. No. 08/756,401 titled "DAQ Configuration System and Method for Configuring Channels in a Data Acquisition Device" filed Nov. 27, 1996, (Docket 5150–18500) whose inventors are Deborah E. Bryant and Audrey F. Harvey, is hereby incorporated by reference as though fully and completely set forth herein.

FIG. 1—DAQ System

Figure 1:
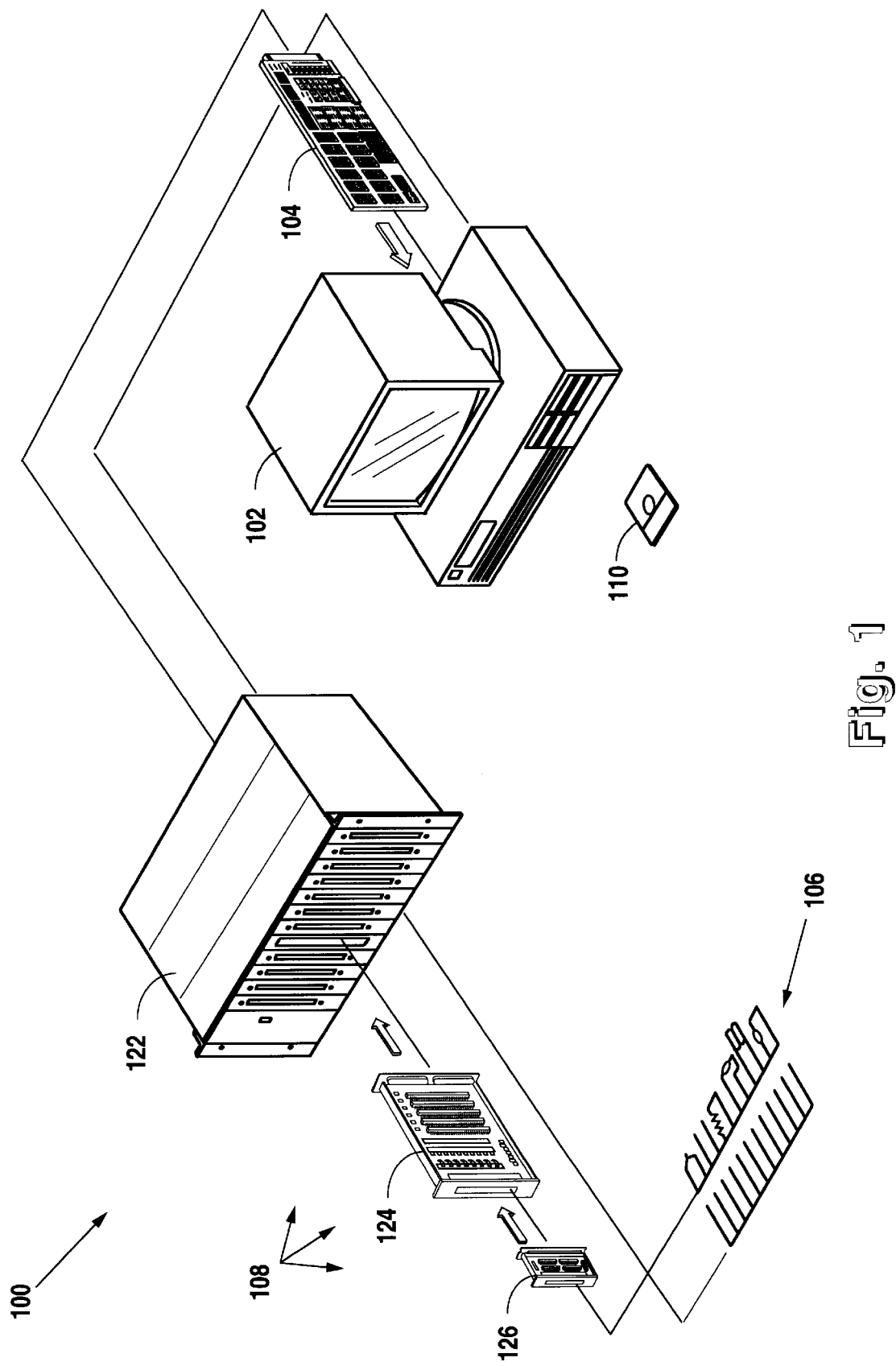
FIG. 1 illustrates a DAQ system according to the present invention.

Referring now to FIG. 1, an illustrative DAQ system 100 according to the present invention is shown. The system 100 comprises a computer 102 running an operating system, a DAQ device or board 104 coupled to the computer 102, and transducers 106 or other detecting means which provide field electrical signals to the DAQ device 104, optionally through signal conditioning circuitry 108. The computer 18 includes various standard components, including at least one central processing unit (CPU), nonvolatile memory, system memory, a hard drive, one or more buses, and a power supply. The computer 102 preferably includes a memory media, such as magnetic media, e.g., a CD-ROM, floppy disk(s) 110, on which computer programs according to the present invention are stored. The software programs of the present invention are also stored in the system memory and/or hard drive of the computer 102 and executed by the CPU. The CPU executing code and data from the memory thus comprises a means for configuring and controlling the DAQ device 104 to acquire/generate data from/to the field signals according to the steps described below.

In one embodiment, the computer 102 comprises input/output (I/O) slots into which the DAQ device 104 is coupled. In another embodiment, the computer 102 comprises a VXI (VME Extensions for Instrumentation) chassis and bus, a GPIB (General Purpose Interface Bus), a serial port or parallel port by which the DAQ device 104 is coupled to the computer 102. Examples of computer 102 are IBM-compatible personal computers, APPLE MACINTOSH computers, and SUN MICROSYSTEM workstations and operating systems which execute on them.

In one embodiment, the transducers 106 are coupled directly to the DAQ device 104. In another embodiment, the signals received by the transducers 106 are conditioned by the signal conditioning circuitry 108 for presentation to the DAQ device 104 as shown. An example of signal conditioning circuitry 108 is Signal Conditioning Extensions for Instrumentation (SCXI) circuitry. SCXI is an open architecture, multi-channel signal conditioning front-end system for DAQ devices. SCXI comprises an external chassis 122 housing signal conditioning modules 124 and optionally terminal blocks 126 for amplifying, multiplexing, and isolating field signals. The signal conditioning modules advantageously reduce the introduction of noise into the signals transmitted to the DAQ device 104. The term "data acquisition" used in this specification is intended to encompass data generation as well as data acquisition, particularly as applied to instrumentation and process control systems.

The transducers 106 and other detecting means provide the field signals representing a process, physical phenomena, equipment being monitored or measured, etc. to the DAQ device 104. Examples of the transducers 106 are strain gauges, thermocouples, thermistors, photoconductive cells, microphones, and piezoelectric transducers, among others.

The DAQ device 104 is configured to acquire or generate signals of distinct I/O types. In particular, the I/O types comprise analog input signals, analog output signals, digital input signals, digital output signals and counter/timer inputs and outputs. The analog input and output signals are received and generated, respectively, on analog "channels" of the DAQ device 104. The digital input and output signals are received and generated, respectively, on digital I/O "ports" of the DAQ device 104. Each channel, port or counter has an associated number which uniquely identifies it with respect to the DAQ device 104 on which it resides. Examples of DAQ device 104 are the following products available from National Instruments Corporation: E Series Multifunction I/O boards, such as the AT-MIO-16 series analog input boards, the AT-AO-6/10 series analog output boards, the PC-DIO-96 digital I/O board, the PC-TIO-10 counter/timer I/O board. Examples of the SCXI circuitry 108 are the following products available from National Instruments Corporation: SCXI-1000 4-slot chassis, the SCXI-I100 32-channel multiplexer amplifier module, and SCXI-1160 16-channel power relay module.

Figure 1A:
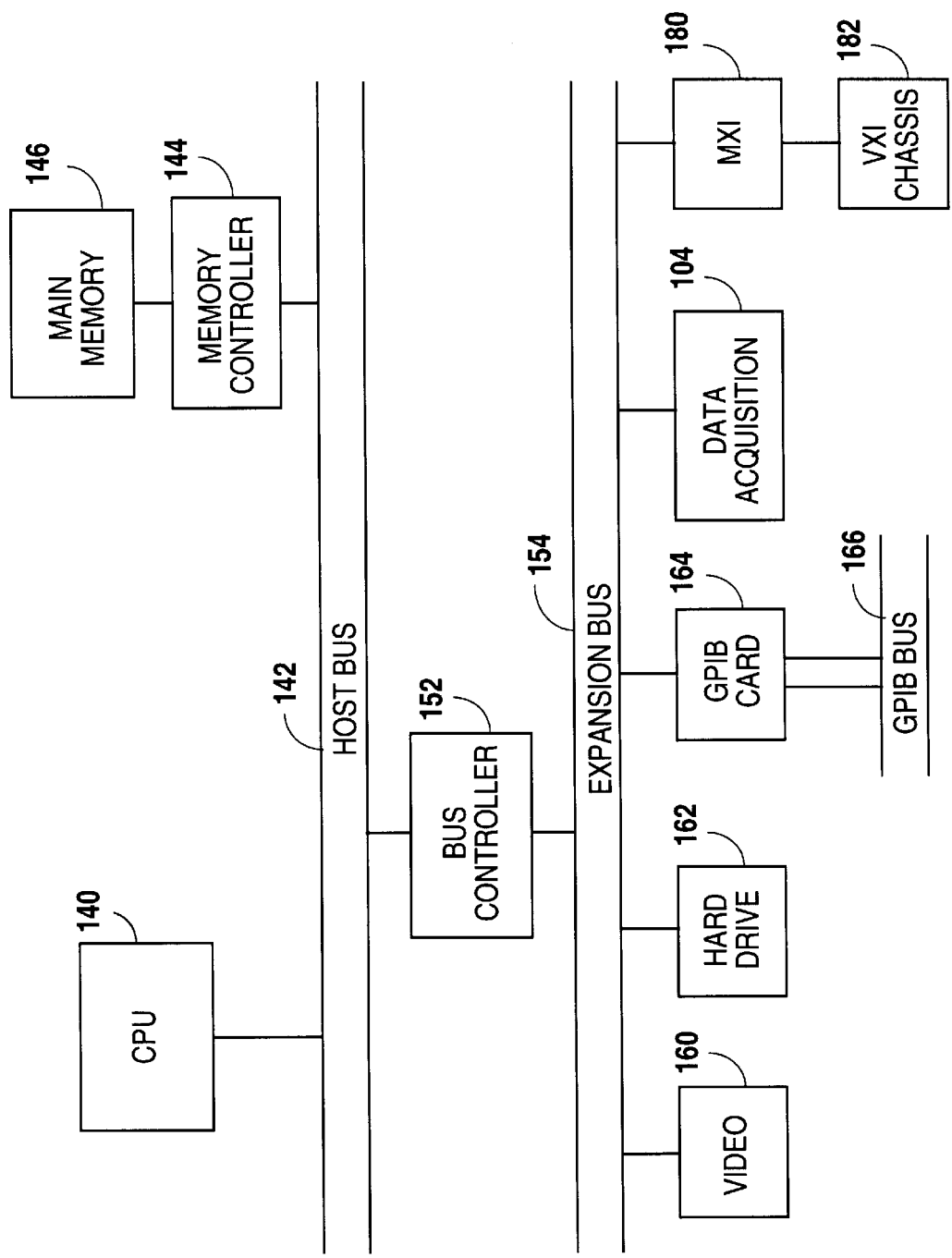
FIG. 1A is a block diagram of the computer system of FIG. 1.

FIG 1A—Computer Block Diagram

FIG. 1A illustrates a block diagram of the computer system 102. It is noted that the computer system 102 may have various different architectures, as desired. The elements of a computer system not necessary to understand the operation of the present invention have been omitted for simplicity.

The computer system 102 includes a central processing unit or CPU 140 which is coupled to a processor or host bus 142. The CPU 140 may be any of various types, including an Intel x 86 processor such as the Pentium class from Intel, a PowerPC CPU from the Motorola family of processors, as well as others.

Main memory 146, also referred to as system memory 146, is coupled to the host bus 142 by means of memory controller 144. The system memory 146 stores various software used in the DAQ system 100, including DAQ driver level software according to the present invention. The DAQ driver level software is preferably NI-DAQ from National Instruments. The system memory 146 also stores a DAQ user application, such as LabVIEW, LabWindows CVI, BridgeVIEW, ComponentWorks, the DAQ Channel Wizard, etc. The system memory 146 may store other DAQ related software, as desired.

Host bus 142 is coupled to an expansion or input/output bus 154 by means of a bus controller 152. The expansion bus 154 is preferably the PCI (Peripheral Component Interconnect) bus, and the bus controller 152 is preferably chipset logic, available from Intel Corporation. The expansion bus 154 includes slots for various devices, including video 160.

A non-volatile memory or hard drive 162 is comprised in the computer system 102 and may be coupled to the expansion bus 154 or to the chipset 152, or to other logic. The non-volatile memory 162 stores an operating system, DAQ software, as well as other application programs, for loading into the system memory 146 as known in the art.

Data acquisition card 104 is connected to the expansion bus 154. The data acquisition card 104 receives analog (or digital) signals from an external sensor or instrument and in turn produces digital data that is provided to the CPU 140 and/or the system memory 146. The DAQ card 104 may also generate signals to the sensors. The DAQ card 104 is controlled by the DAQ driver level software and the DAQ user application executing in the system memory 146.

The computer system 102 may also include a GPIB (General Purpose Interface Bus) card 164 that interfaces to one or more instruments via the GPIB bus 166, and may include a MXI card 180 that connects to a VXI chassis 182.

FIG. 2—DAQ Software Block Diagram

Referring now to FIG. 2, a block diagram illustrating the relationship of portions of the DAQ system 100 (FIG. 1) is shown. DAQ application software interfaces with DAQ driver level software according to the present invention to configure and control the DAQ device 104 (FIG. 1).

The DAQ application provides an interface to the user of the DAQ system. The user receives output via output devices of the computer 102, such as a display screen, and provides input via input devices such as a mouse or keyboard of the computer 102 (of FIG. 2) to direct the acquisition of field signal data. In addition, the DAQ application calls functions of the DAQ driver level software to configure the attributes of the DAQ device 104, DAQ system 100, or a DAQ task to control the acquisition of field signal data by the system 100.

The DAQ driver level software provides a means for the DAQ application to interface to the DAQ device 104. The DAQ driver level software comprises device drivers for communicating with the DAQ device 104. The device drivers perform input/output operations to registers on the DAQ device 104 or perform memory transfers to shared memory on the DAQ device 104 to configure and control the DAQ device 104. The device drivers also service interrupts from the DAQ device 104 and perform direct memory access data transfers from or to the DAQ device 104 when appropriate. Further, the device drivers interact with the operating system executing on the computer 102 to perform such operations as allocating memory for the DAQ application 32 and device interface software itself. The device drivers execute at the required privilege level to perform the aforementioned operations.

FIG. 3—DAQ driver level software architecture

FIG. 3 is a block diagram which illustrates the software architecture of the DAQ driver level software according to the present invention. According to the preferred embodiment of the present invention, the DAQ driver level software comprises an improved modular software architecture. As shown, the DAQ driver level software of the preferred embodiment includes a DAQ device object layer, an interpreter layer, and a mini-driver primitives layer.

The DAQ driver level software comprises DAQ device object software, also referred to as device class software. The DAQ device object comprises a software object corresponding to the particular device installed in the DAQ system. In general, each DAQ device installed in the DAQ system includes a corresponding DAQ device software object installed in the system.

In the preferred embodiment, the DAQ system includes a base device class which is a template used for creation of a device class. A device class is thus a class, preferably a C++ class, that inherits from a base device class. The base device class includes a plurality of NI-DAQ functions. Most NI-DAQ functions in the base device class return a noSupportError, meaning that the function is not supported by the device. This is because the base device class is a template for the creation of DAQ objects, and the template itself does not support any functions. When a device class is created or instantiated from a base device class for a particular device, such as a PCI-MIO-16E-1 or an AT-4350, the device class (e.g., ESeriesDevice) overrides the functions in the base device class that the device class will support. The functions that the device class does not override continue to return noSupportError, since the base class implementation is used.

The primary purpose of the DAQ device object is to create the respective interpreters and mini-driver primitives used in controlling the respective DAQ device. In the preferred embodiment, the DAQ device object first creates a mini-driver code portion or object which in turn creates the mini-driver primitives. In the preferred embodiment, the DAQ device object also acts to receive calls from the DAQ user application and forward these calls to the appropriate interpreter.

The DAQ driver level software also includes one or more interpreters. Each interpreter is comprised of a set of public functions that can be called by a user application. An interpreter can use various managers available in NI-DAQ software, including a memory manager, a buffer manager, and a bus object, among others. The interpreter comprises all of the common tasks that a family of DAQ boards require, or that all DAQ boards require, and which can be made hardware independent. In other words, each of the interpreters performs functionality which is common for a plurality of DAQ devices, such as buffering, messaging which does not require board programming, setting up SCXI and AMUX attachments to the device, performing parameter validation on incoming function parameters and scaling to engineering units, among others. In the presently preferred embodiment, the interpreter does not include a base class.

An interpreter implements a subset of an interface, such as the NI-DAQ language interface, a LabVIEW interface layer, or another interface. Interpreters operate to call or invoke mini-driver primitives, which perform the low-level work that is hardware specific. Interpreters are useful because they can be used by multiple device classes, as long as there is similar functionality.

The interpreter interfaces a group of mini-driver primitives with a set of higher-level functionality. The interpreter operates to lock primitives before use and unlock primitives after use. The interpreter also maintains a per-process state which lives in the context of the calling process. Further, the interpreter uses iterators to transfer data streams to/from primitives The DAQ driver level software further includes a plurality of mini-driver primitives. The term "mini-driver primitive" or "primitive" is used herein to refer to a body of code that performs a portion of the programming of and communication with the DAQ board. Each of the mini-driver primitives thus performs a portion of controlling the DAQ device. In other words, the DAQ device includes a plurality of hardware resources for performing DAQ functions, and each of the plurality of mini-driver primitives controls one of the hardware resources. For example, where the plurality of hardware resources on the DAQ board include an analog input channel 1, an analog output channel 1, a digital port 0, a waveform generator, and a counter, the plurality of mini-driver primitives include an Analog Input Channel 1 (AI Channel 1) engine or primitive, an Analog Output Channel 1 (AO Channel 1) engine or primitive, a Digital Port 0 (Dig Port 0) primitive or engine, a waveform engine (WFM Engine) primitive, and a counter engine (CTR Engine) primitive. A board may also include a group engine. For example, in a DIO-32HS board, which has 4 digital ports, each port includes a corresponding digital port primitive, and the digital group primitive controls multiple digital port primitives.

The mini-driver primitives each represent a physical programmable primitive on the device. In the preferred embodiment, each of the mini-driver primitives, referred to simply as primitives, maintains the state of the physical primitive as a collection of attribute/value pairs. Each of the primitives responds to control calls and interrupts to move the mini-driver and device from state to state. Further, each of the primitives communicates over the bus to program the DAQ device hardware for the desired state. Finally, each of the primitives are individually locked/unlocked to reduce errors. A mini-driver code portion is used to create each of a plurality of mini-driver primitives, each of which implement a subset of board functionality. Thus, in the present application, when it is stated that a mini-driver performs a function, in actuality a mini- driver primitive (or primitives) carries out the action. The mini-driver code portion is essentially an umbrella for code and data specific to a device type or device family, which is instantiated in kernel mode. The mini-driver code portion is responsible for instantiation, registration, and lookup of the "primitives" specific to a device type.

Thus, the interpreter comprises the generic functionality which is generic to or independent of a number of DAQ devices or boards, i.e., is independent of a family of devices, and the mini-driver primitives comprise the board-specific functionality. This provides improved modularity and allows for more efficient and effective re-use of code. More specifically, the present invention provides a reusable framework for writing new drivers, e.g., development of reusable interpreters and primitives, while maintaining driver independence. The DAQ driver level software of the present invention also provides a number of other advantages, including granular resource locking, platform independence, case of migration to new APIs, and an improved multi-thread/multi-process model. Further, the present invention provides encapsulated code for device families while providing a framework for interfacing with other reusable components.

Also, in the preferred embodiment, the interpreter executes in user mode of the computer system, and the mini-driver primitives execute in kernel mode. This provides improved efficiency for execution of the interpreter and primitive code. For example, the software architecture of the present invention operates to store the device state soft copy in kernel mode, while avoiding file I/O and floating point operations in the kernel. Also, the software architecture stores process-specific information in the context of the executing process in user mode.

Figure 4:
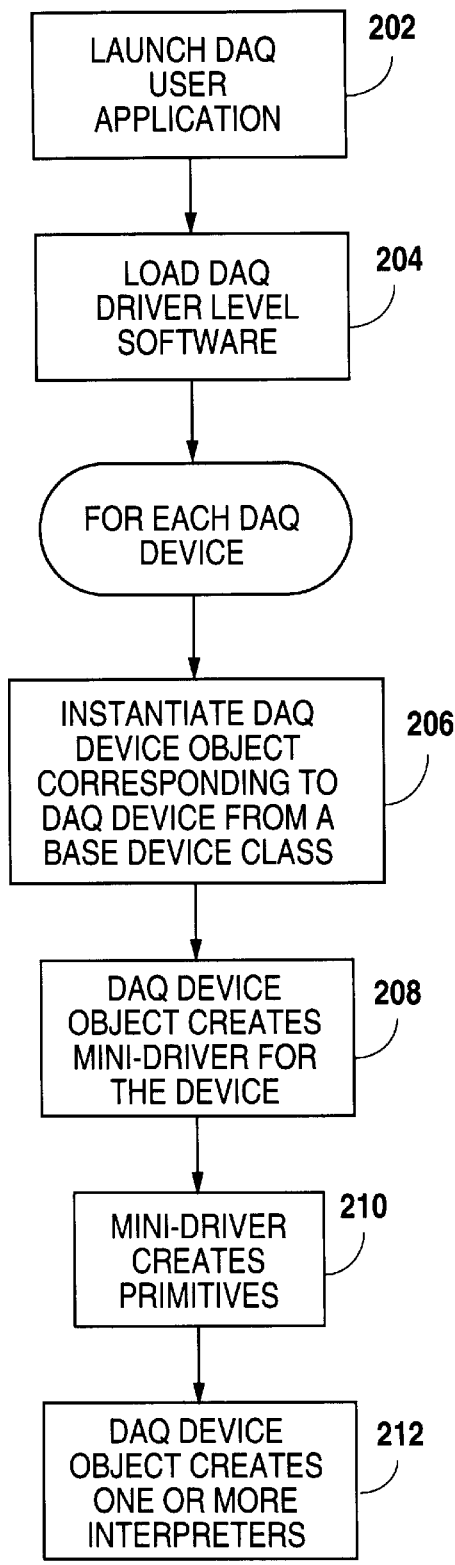
FIG. 4 is a more flowchart illustrating start-up of the DAQ driver level software.

FIG. 4—Configuring DAQ Driver Level Software

FIG. 4 is a flowchart diagram illustrating operation of creating and/or configuring the various software components in the DAQ driver level software. As shown, in step 202 the user launches a data acquisition user application, i.e., the DAQ user application is loaded into the computer system memory 146. As discussed above, the DAQ user application can be various applications such as LabVIEW, LabWindows CVI, the DAQ Channel Wizard, BridgeVIEW, VirtualBench, ComponentWorks, or the DAQ Solution Wizard. The above applications are available from National Instruments Corporation.

In step 204 the computer system loads the DAQ driver level software of the present invention in response to launching of the DAQ user application in step 202. A portion of the DAQ driver level software preferably comprises a dynamic link to library (DLL) which is loaded in step 204.

After the DAQ driver level software is loaded in step 204, steps 206–212 are performed for each DAQ device present in the DAQ system 100. As shown, in step 206 the DAQ driver level software instantiates a DAQ device software object corresponding to a respective DAQ device. The DAQ device object is instantiated from a base device class. Thus, the DAQ device object is a software object which corresponds to a physical DAQ device present in the DAQ system 100.

In step 208 the DAQ device object creates a mini-driver for the device. The mini-driver essentially comprises code for creation of mini-driver primitives. In step 210 the mini-driver created in step 208 operates to create mini-driver primitives. As discussed above, the mini-driver primitives comprise objects which perform the low-level details of configuring in or communicating with the DAQ device, i.e., programming registers to configure the device to perform a desired function. In step 210 the DAQ device object receives a pointer to the mini-driver created in step 208. In step 212 the DAQ device object creates one or more interpreters which are required. The DAQ device object operates to provide a pointer to the mini-driver to each of their respective interpreters. In other words, each of their respective interpreters receives a pointer to the mini-driver. Also, during construction or creation of the interpreters the pointer to the mini-driver is used to locate all of the mini-driver primitives that the interpreter will need to perform the low-level work of communicating with the DAQ device. When steps 206–212 have been completed, then all of the various software components have been created or instantiated for communicating with the respective DAQ device.

Figure 5:
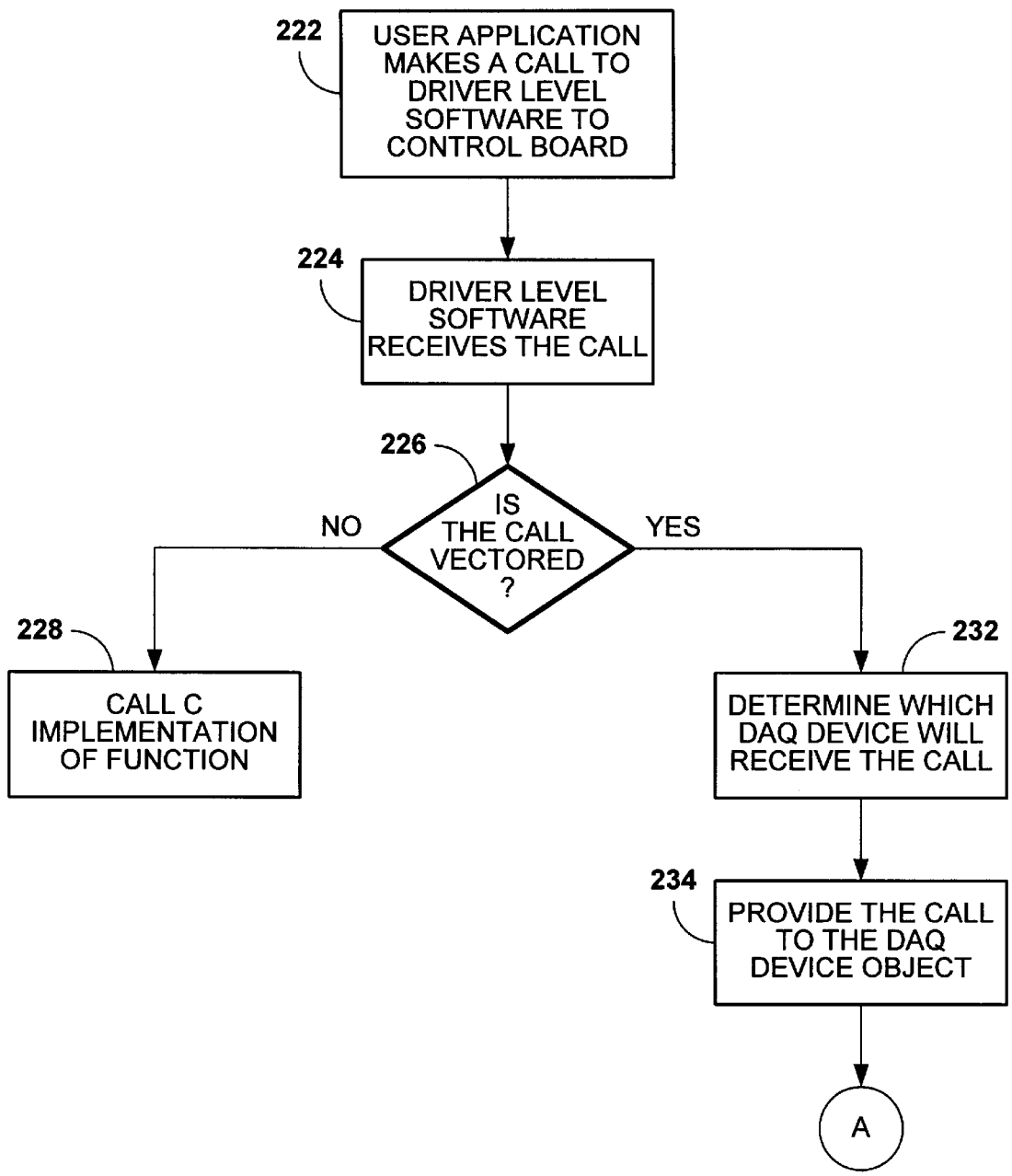
FIGS. 5 and 6 are a flowchart illustrating operation of the DAQ driver level software.
Figure 6:
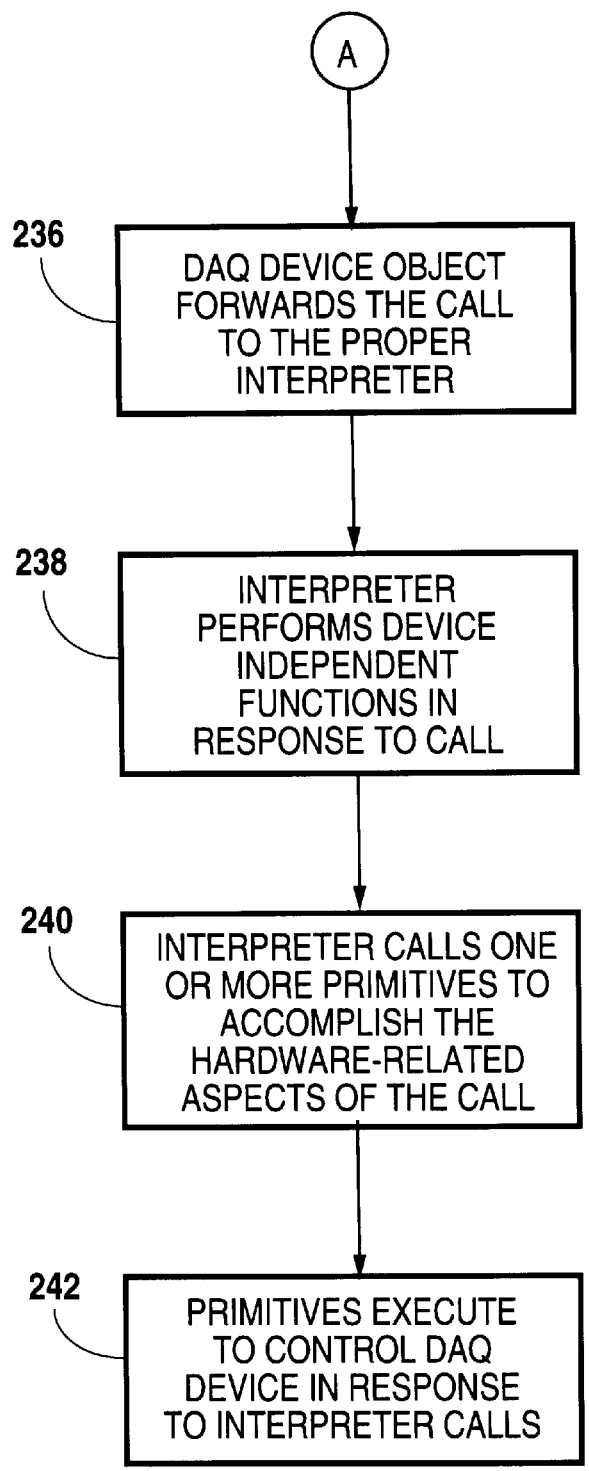

FIGS. 5 and 6—Operation of the DAQ Driver Level Software

FIGS. 5 and 6 are a flowchart diagram illustrating operation of the DAQ driver level software according to the preferred embodiment of the invention. As shown, in step 222 the DAQ user application makes a call to the DAQ driver level software to control the DAQ board or DAQ device 104. In step 224 the DAQ driver level software receives the call.

In step 226 the DAQ driver level software determines if the call is a vectored call. If the call is determined to not be a vectored call in step 226, then in step 228 the DAQ driver level software calls the C implementation of the function. In other words, in step 228 the DAQ driver level software begins execution of a function referenced by the call. Thus, if the call is not a vectored call, then a prior art DAQ driver level software architecture implementation is used when the call merely indexes to a respective function that is executed to accomplish the desired result.

If the call is determined to be a vectored call in step 226, then in step 232 the DAQ driver level software determines which DAQ device will receive the call. Thus, if two or more DAQ boards 104 installed in the DAQ system 100, in step 232 the DAQ driver level software determines which DAQ board 104 is intended to receive the call.

In step 234 the DAQ driver level software provides the call to the DAQ device software object corresponding to the respective physical DAQ device. In step 236 (FIG. 6) the DAQ device object software forwards the call to the proper interpreter object. Thus, depending upon the type of function the call is desired to perform, the DAQ device object forwards the call to the respective interpreter which is capable of handling the desired function to be performed.

In step 238 the interpreter performs various device independent functions, i.e., functions which are independent across a plurality of devices. As noted above, the interpreter may perform functions such as buffering, messaging which does not require board programming, setting up SCXI and AMUX attachments to the device, performing parameter validation on incoming function parameters and scaling to engineering units, among others.

In step 240 the interpreter calls one or more primitives to control or communicate with the DAQ hardware device. The interpreter typically generates one or more calls, generally a plurality of calls, to each of a plurality of the mini-driver primitives in response to a received call from the DAQ user application. The interpreter calls one or more primitives to accomplish the hardware-related aspects of the call.

In step 242 the mini-driver primitives performs operations to control the DAQ device in response to calls from the interpreter. As physically con, the mini-driver primitives operate to physically control and/or configure the DAQ board 104. Also, the mini-driver primitives are specific to the respective DAQ device or board being called.

Figure 7:
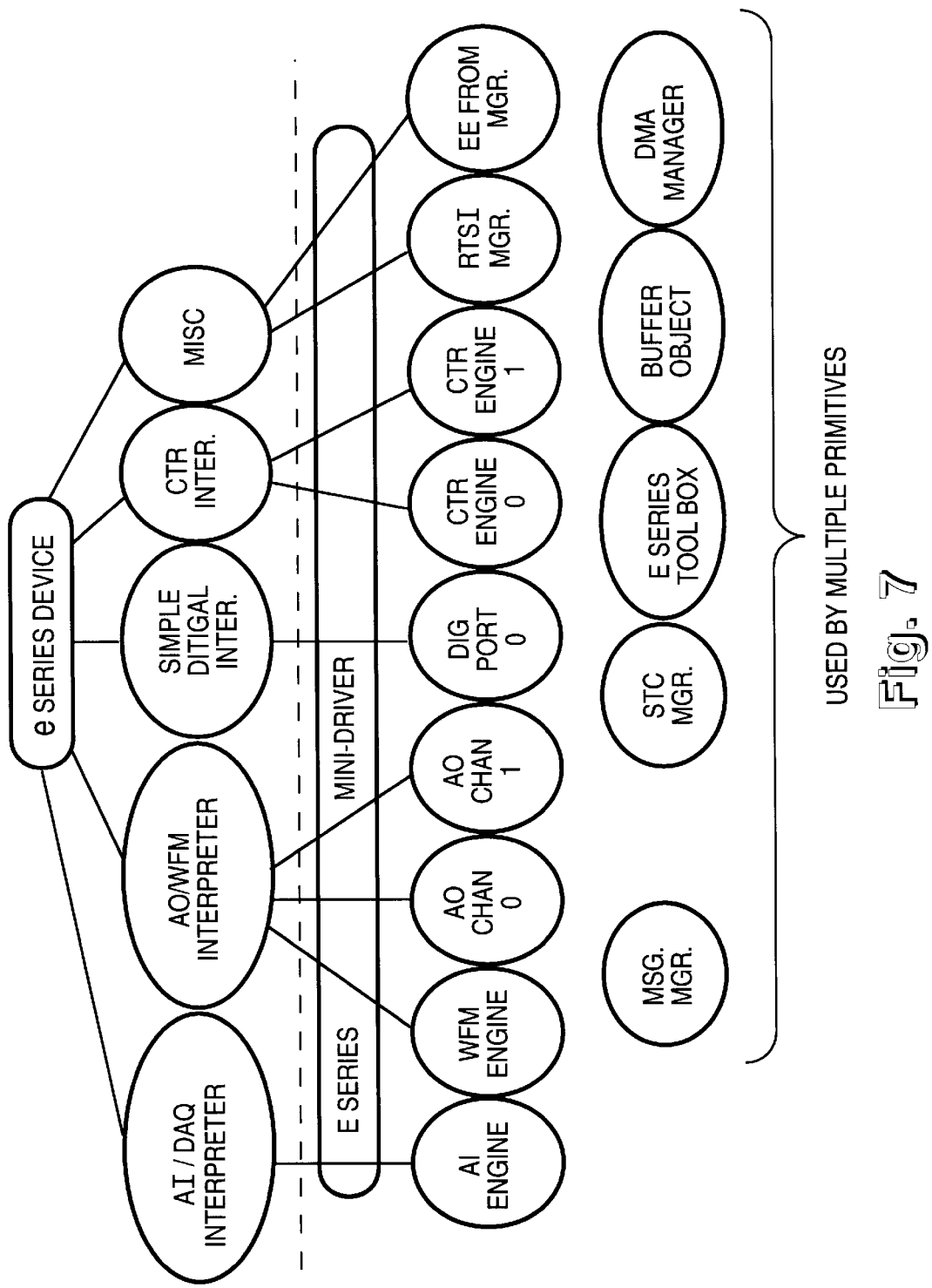
FIG. 7 is a block diagram illustrating an example of the hierarchy of software components or objects in the DAQ driver level software.

FIG. 7—DAQ Software Components

FIG. 7 is a block diagram illustrating an example configuration of various software components comprised in the DAQ driver level software according to the present invention. This example is for an E series DAQ board available from National Instruments Corporation. The E Series Device class is used in this example since it includes MIO functionality and demonstrates the concepts of the present invention. Other device classes are similar.

As shown, the DAQ device software object is referred to as "E Series Device". The E Series Device object creates the mini-driver, referred to as the E Series Mini-Driver. As shown, the DAQ device software object is referred to as "E Series Device". The E Series Device object creates the mini-driver, referred to as the E Series Mini-Driver. The E Series Device object then creates the various required interpreters. In the example of FIG. 7, the E Series Device object creates the AI/DAQ Interpreter, the AO/WFM Interpreter, the Simple Digital Interpreter, the Counter Interpreter, and a Miscellaneous Interpreter. The E Series Device object passes in a reference to the E Series Mini-Driver in the constructor for each interpreter.

The E Series Mini-Driver then creates the various primitives. In the example of FIG. 7, the E Series Device object creates the following primitives: Analog Input (AI) Engine primitive, Waveform (WFM) Engine primitive, Analog Output (AO) Channel 0 primitive, Analog Output (AO) Channel 1 primitive, Digital Port 0 primitive, Counter Engine 0 primitive, Counter Engine 1 primitive, RTSI Manager primitive, and EEPROM Manager primitive. The above primitives are created by the E Series Mini-Driver.

The various primitives control the corresponding hardware resources on the DAQ device. For example, the WFM Engine controls waveform resources on the DAQ device, and the AO Channel primitives control the respective Analog output channels on the DAQ device. In other words, the respective primitives program or read/write respective registers on the DAQ device, such as the DAQ board 104, to program or control the board 104 for the desired functionality.

These primitives in turn use the services of other primitives or managers for common services, these including the Messaging (Msg) Manager, the STC Manager, the E Series Toolbox, the Buffer Object, and the DMA Manager.

The ToolBox component is used for common services, such as I/O. The ToolBox contains functionality required by a plurality of primitives. The base class mdToolBox preferably creates a bus object. This is useful since most mini-drivers will have some primitives that perform I/O. Individual mini-drivers can also create their own toolbox, which inherits from the base class mdToolBox. The toolbox preferably only contains code that cannot be located in an appropriate primitive. Examples include:

shared registers that A1 and AO both use to tell the board what DMA channel to use reservation of shared resources like counter 0 on a Lab/1200 device.

Certain DAQ devices have a flat register space, and all registers are accessible with a single read or write. Other DAQ devices have a windowed register space, and require a pair of accesses for reads and writes. Knowledge of the type of register space is comprised in the toolbox, which handles all reads and writes to the board, and is therefore hidden from all the primitives.

It is noted that the toolbox is only for use by primitives. If it is desired for the interpreter to have access to toolbox functionality, this functionality is preferably placed in a primitive that the interpreter can use.

The Buffer Object and the DMA manager are used for intelligent buffering and DMA capabilities. The STC Manager is used for intelligent timer/counter capabilities. The Message Manager handles messaging to the user application in response to events or interrupts.

The E Series Device object operates to receive calls from a DAQ user application, and operates to create and dispatch these function calls to a respective interpreter, in this case one of the AI/DAQ Interpreter, the AO/WFM Interpreter, the Simple Digital Interpreter, the Counter Interpreter, and the Miscellaneous Interpreter. Thus, function calls coming into the E Series Device class are routed to the appropriate interpreter. For example, calls such as Set—DAQ—Device—Info and Timeout—Config are routed to each appropriate interpreter. The respective Interpreter uses the mini-driver primitives to perform the low-level hardware operations. In other words, the respective Interpreter calls or invokes respective ones of the mini-driver primitives to actually perform the communication and configuration with the DAQ device or board.

It is noted that certain miscellaneous functions or operations that do not fit into a reusable interpreter are preferably comprised in the E Series Device class. In one embodiment, the DAQ device object, such as the E Series Device class, can call primitives, such as an EEPROM primitive or RTSI primitive, in order to perform operations or obtain information, such as obtaining the board revision, outputting signals on a PFI or RTSI pin, obtaining the Mite revisionflavor, etc. In another embodiment, the DAQ device object cannot call mini-driver primitives, i.e., only interpreters can call primitives.

In the preferred embodiment, the interpreter executes in user-mode, and the mini-driver primitives execute in kernel-mode. However, this is not an absolute requirement, and in an alternate embodiment both the interpreter and the mini-driver execute in user mode, or both execute in kernel mode. The dotted line in FIG. 7 represents the user-mode/kernel-mode separation, wherein the blocks above the dotted line execute in user mode, and the blocks below the dotted line execute in kernel mode.

The Attribute Space

The Attribute Space comprises primitives, attributes, values, and control codes. As discussed above, primitives are created by a mini-driver, and are used by interpreters to perform actual communication with/configuration of the board. Primitives have a set of attributes, which themselves have values. Primitives also support a set of control codes, which are used in conjunction with the Control method on a primitive. Following are some examples of each, with short code examples:

---
Primitives - kmdpXXX kmdpAIChannel
kmdpWFMEngine
kmdpEEPROM
err = cMyMini-driverPtr->Find (kmdpAOChannel, i,
&cAOChannelPtr[i]);
Values - kmdvXXX kmdvUnipolar, kmdvBipolar
kmdvOn, kmdvOff
kmdvFIFOEmpty

---

-continued

Attributes - kmdaXXX kmdaPolarity
kmdaMatchPattern
kmdaIterationsDone
err = cAOChannelPtr[channel]->Set(kmdaPolarity, kmdvBipolar);
err = cWFMEnginePtr[grpIndex]->Get(kmdaIterationsDone,
&localItersDone);
Control Codes - kmdcXXX kmdcStart, kmdcStop, kmdcPause, kmdcResume
kmdcSetStopAddressRegister, kmdcStep
return cWFMEnginePtr[grpIndex]->Control(kmdcStart);

---

The Interface

Mini-driver Interface

The mini-driver code itself is primarily useful for finding primitives owned by the mini-driver. Following is the Find method (see the example in the previous section)

```
virtual tStatus Find(mdPrim primitivetype, u32 primitiveNumber,
    mdprimitive** outPrimitive);
```

Primitive Interface

The Primitives interface is where all DAQ device operations are performed. An interpreter accomplishes most of its work using primitives. Following is the API presented by all primitives in the preferred embodiment. The Set, Get, Lock, Unlock, and MakeIterator methods are all provided by the mdPrimitive base class. The remaining methods are implemented by the derived primitive. Some primitives override the Set and Get calls with their own implementation, but the Set and Get calls provided in the base class are preferably used.

```
virtual void Set(mdAtt attribute, mdVal value);
virtual void Set(mdAtt attribute, u32 value);
virtual void Set(mdAtt attribute, i32 value);
virtual void Set(mdAtt attribute, void * voidPtr);
virtual tStatus Get(mdAtt attribute, mdVal* value);
virtual tStatus Get(mdAtt attribute, u32* value);
virtual tStatus Get(mdAtt attribute, i32* value);
virtual tStatus Lock();
virtual tStatus Unlock();
virtual tStatus ProgramHardware();
virtual tStatus Control(mdCon action);
virtual tStatus Check();
virtual tStatus SoftInitialize();
virtual tStatus SetIterator(tIterator* iteratorPtr);
virtual tIterator* MakeIterator(tBuffer& buffer, tIterator::Direction direction);
virtual tStatus DeleteIterator(tIterator* iteratorPtr);
virtual tIterator* MakeSequenceIterator(tBuffer& buffer,
    tIterator::Direction direction, tSequenceIterator::SampleOffsetInScan* ss,
    u32 ssSize);
virtual tIterator* MakeDMAIterator(tBuffer& buffer, tIterator::Direction direction);
virtual tIterator* MakeMsgIterator(tBuffer& buffer, tIterator::Direction direction,
    tBlockReference *runBlockRefPtr);
virtual tIterator* MakeMsgDMAIterator(tBuffer& buffer, tIterator::Direction direction,
    tBlockReference *runBlockRefPtr);
```

Example: AO Write

```
inline i16 AOWFMInterpreter::AOWFM_AO_Write (const i16 channel, const i16 value)
{
 tStatus err = noError;
 // Parameter Validation
 if (channel < 0 || (u32) channel >= cNumChannels)
   return badChanError;
 err = ValidateBinaryValue(channel, value);
 if (err != noError)
   return (ndErr) err;
 err = cAOChannelPtr[channel]->Lock();
 if (err != noError)
   return transferInProgError;
 cAOChannelPtr[channel]->Set(kmdaBinaryValue, (i32) value);
 err = cAOChannelPtr[channel]->Control(kmdcStart);
 // You should always be able to release a primitive you have reserved.
 DaqErrAssert (cAOChannelPtr[channel]->Unlock());
 return (ndErr) err;
}
```

Discussion: After validating the incoming function parameters, the channel is locked. Due to the nature of the NI-DAQ DLL, the only way the call could fail is if a waveform was in progress on the same channel, in which case an error would be returned. If the lock is successful, a Set() call is made, to send the value to write down to the mini-driver. The Control() call causes the value to be written out to the DAC. The channel is then unlocked before exiting the function.

Before the above AO—Write ever took place, configuration related attributes were sent down to the mini-driver, if the user desired something other than the default values. For example, the following configuration related attributes were sent down to the mini-driver:

cAOChannelPtr[channel]->Sct(kmdaUpdateMode, kmdvImmediate);

cAOChannelPtr[channel]->Set(kmdaPolarity, kmdvunipolar);

cAOChannelPtr[channel]->Set(kmdaReferenceSource, kmdvExternal);

In the preferred embodiment, the basic mini-driver primitive API (Set, Get, Control, Lock, Unlock, Check) is the same for all primitives. The specifics differ for each class of device, and of course the different subsections (AI, AO, CTR, DIG) have different characteristics. Maintaining a common mini-driver API makes it easier to understand code developed by other authors.

In one embodiment, successive calls of primitive functions only require one user/kernel transition.

Benefits of the Interpreter/Mini-driver model of the present invention

Code reuse by sharing interpreters

Using the DAQ driver level software architecture of the present invention, devices that share most characteristics are now able to use the same interpreter. The mini-driver primitive interface is identical, and the interpreter knows what is/is not possible for the different devices it is capable of handling. In the simplest case, a few capability attributes, like extRefCapable or numChannels (16 or 64 for example) will be sufficient to distinguish between boards. In this case, the interpreter code is device-independent, except at initialization time, when these attributes/capabilities are decided. When devices diverge in their capabilities, in one embodiment a subclass is used which overrides the functions that are different.

When devices are fundamentally different, separate interpreters are preferably created. For example, the E Series AO/WFM capabilities, and the Arbitrary Waveform Generator (National Instruments 5411 products) are sufficiently different that it is desirable to provide separate interpreters. Also, a separate interpreter is sometimes used because a board is so simple, and it is unnecessary to use the full capabilities of an interpreter, such as the AO Interpreter for a PC-AO-2DC device.

Implementing an API, such as the NI-DAQ API from National Instruments, is a time-consuming process. In general, various decisions must be revisited when new functionality is supported. The software architecture of the present invention utilizes one interpreter that can use any of several mini-drivers. As a result, the mini-driver primitive behavior is much clearer, and there is less room for interpretation. Error codes are particularly easy to implement inconsistently.

Migration to New APIs

Figure 8:
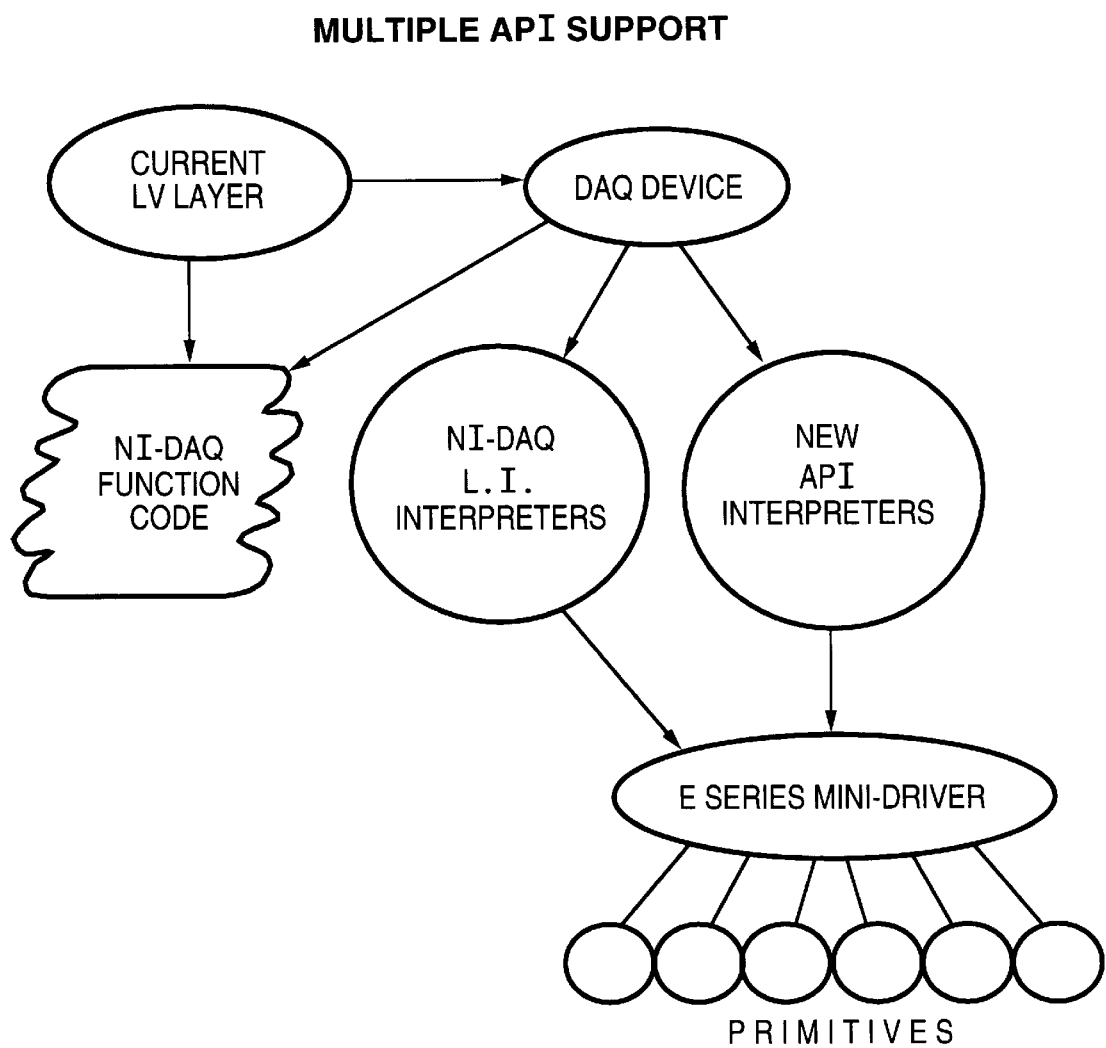
FIG. 8 is a block diagram illustrating multiple API support provided by the DAQ driver level software.

FIG. 8 illustrates DAQ driver level software including multiple API support, wherein the multiple API support eases the migration to the new software architecture and API of the present invention. As shown, the DAQ device object software, shown in FIG. 8 as "DAQ device", receives a function call from a user application and can utilize various types of interpreters. As shown, the DAQ device object can directly invoke functions in the legacy NI-DAQ function code, as discussed above with reference to step 228 of FIG. 5A. The DAQ device object can also route the function call to NI-DAQ Language Interface Interpreters, which operate to receive calls made to a legacy API and convert the call into a plurality of calls to mini-driver primitives. When the DAQ device object receives a call made to a newer or different API, the call is preferably routed to New API Interpreters, as shown.

The daqDevice class can thus route calls to the old NI-DAQ interpreter, or other interpreters, providing the ability to support more than one API, without compromising any new APIs by trying to build a new API on top of an old API. In one embodiment, concurrent use of multiple interpreters is allowed, thereby enabling backwards compatibility while still supporting a new interface.

For new DAQ boards that are not required to support a legacy API, such as the current NI-DAQ interface, only the new interpreters are preferably used. For boards that demand backwards compatibility, the old or legacy interpreters are also preferably supported.

For boards that have simple digital I/O support (MIO, Lab/1200, LPM/500/516/700, etc.), several interpreters could be developed, (old NI-DAQ, LabVIEW layer, New API). In this instance, as long as the new board had a digital port primitive, the person adding support for the new board could pick and choose his interpreters.

Per-process views of a device

In the preferred embodiment, there is only one instance of a mini-driver per device, which all processes share. Mini-driver primitives, such as an AO Channel or an AI Engine, are limited resources which all applications must compete for.

Interpreters are preferably designed to present a per-process abstraction to the user. The mini-driver primitive can be used by several processes (interpreter instances) at the same time, although there are preferably limitations with regard to concurrent use of the same mini-driver. For example, each process is preferably able to use a subsystem, like AI, AO, CTR, or Digital, but two processes are not allowed to use the AI subsystem at the same time.

The current embodiment of the DAQ driver level software has a one-copy-for-all-processes model. The LabVIEW layer on the other hand actually provides a per-process view of tasks. The preferred embodiment of the DAQ driver level software includes a per-process view of each DAQ device. Project Independence Mini-driver development can proceed with minimum impact on other parts of the DAQ driver level software. When interpreters are shared and need to be modified to accommodate a new mini-driver, only the users of that interpreter are affected.

Interaction with Managers

In the preferred embodiment, the mini-driver primitives interact with software managers, such as the bus object, the buffer object, and the DMA manager. In other words, primitives make use of various managers to accomplish their functions. This facilitates support of new boards. The use of C++ base classes allows every primitive to inherit common functionality. Also, a consistent approach to writing mini-driver primitives makes the process more understandable for a beginner.

Execution of Mini-Driver Primitives on a Remote CPU

In one embodiment, the interpreter and the mini-driver/primitives are separately executed on distinct processors/computers via a communications link (Ethernet, Infrared, the Internet, etc.). Since most of the information sent to a mini-driver is in the form of integers and floating point values (no pointers to shared memory), the only components that are changed are the mini-driver proxy mechanism, the messaging manager, the buffer object, and the DMA Manager.

Interpreter Operation

The interpreter performs all parameter validation and sanity checking. The interpreter also knows about mini-driver capabilities. This allows the mini-driver primitives to be generic for a class of devices that are fundamentally the same, but have minor differences. For example, the interpreter should not ask a National Instruments DAQPad-MIO-16XE-50 to use DMA, since this device does not have DMA capabilities. Likewise, the interpreter should not ask a National Instruments XE-50 device to set up Channel 0 for external reference, since that is not possible on XE-50 devices, like it is on E-1 devices. The interpreter also performs complex double-buffered operations.

The interpreter also causes the mini-driver to move from state to state. A mini-driver primitive's possible states, and the means for getting from one state to another are preferably clearly documented. The interpreter is responsible for following the rules, and moving the primitive from one state to the next. The author of a mini-driver primitive may wish to put assertions in the code to alert the mini-driver primitive user to improper usage. It is noted that it is not unreasonable for the mini-driver primitive to crash if it is not used properly.

Figure 9:
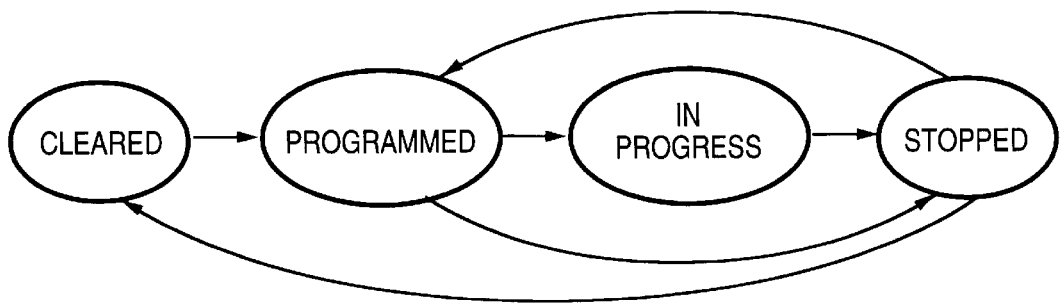
FIG. 9 illustrates a state diagram of a mini-driver primitive.

FIG. 9 illustrates an example of the states of the Waveform Engine, i.e., illustrates the Waveform Engine state diagram. In this example, if a waveform operation is in progress, i.e., in the In Progress state, and the user desires to move the primitive to the Cleared state (while the primitive is still in progress), the interpreter should first move the primitive to the Stopped state, and then the Cleared state. The primitive is not responsible for knowing how to move from the InProgress state to the Cleared state.

Mini-driver Primitive Operation

The mini-driver primitives perform all hardware programming. In other words, all I/O to the board is performed by respective mini-driver primitives, preferably without exception. In an alternate embodiment, I/O services (such as peek and poke) can be exported on an as-needed basis.

The mini-driver primitive preferably uses techniques to allow for efficient hardware programming. For example, when practical, mini-driver primitives maintain soft copies of the last value written to the hardware, and only write new values to the hardware when necessary. For example, a primitive could remember the current filter setting, and compare it to the desired filter setting. If the value has not changed, the programming of that filter can be skipped.

The mini-driver primitive preferably handles board-level shared resources. As an example, the mini-driver primitive preferably handles DMA channel reservation/availability. An error is returned by the Start call if the necessary DMA channel(s) is not available. The interpreter is required to know certain information regarding board-level shared resources, such as Mite capabilities, but the interpreter is only required to know about capabilities, not implementation.

The mini-driver primitives hide hardware differences from the interpreter layer. For example, if the interpreter tells the AI or AO channel to be in unipolar mode, the way in which this is accomplished is entirely up to the mini-driver primitive. Furthermore, the loading of calibration constants for appropriate polarity is totally transparent to the interpreter.

The mini-driver primitive is also independent of interpreters' APIs and their limitations. In other words, a mini-driver primitive is preferably written independently of any Interpreter API being implemented. It is important that the mini-driver primitive export all of its functionality, and the interpreter is required to operate with this functionality.

For example, consider specification of source for an external update clock. In the NI-DAQ Language Interface, the user can specify that an external update clock should be used for waveform generation. However, the Waveform calls do not provide a way for the user to specify in detail the source of that update clock. The default is PFI5, but the user can change that to a variety of other sources by calling Select—Signal.

In one implementation of the AO WFM Interpreter, an external update clock is presumed to be desirable, and thus the value kmdaClockSource=kmdvExternal is sent down to the mini-driver primitive. Inside the mini-driver primitive, the STC Manager is called to determine how the update clock was currently set up. If the update clock was set Up for Internal, then it is known that the user did not previously call Select—Signal, and the STC manager is asked to set the update clock source to PFI 5. However, if the update clock was already set up for something else, like PFI 7, or RTSI 8, then the user did call Select—Signal, and things are left alone.

In another embodiment of the AO WFM Interpreter, the interpreter intercepts the call to Select—Signal. If the user is specifying something that is AO or WFM related, the interpreter captures the user's desired setting, but does not do anything at that time. When the waveform operation is started, the interpreter sends down kmdaClockSource= kmdvPFI (or kmdvRTSI) and kmdaClockSourceNumber=7. The mini-driver primitive now knows exactly how to program the hardware. When the same mini-driver is used to implement the LabVIEW API, or the new API, which allows for exact specification of the clock source, the mini-driver is ready to accept the exact specification.

Mini-drivers in User-Mode

A very useful characteristics of mini-drivers is the ability to have the mini-driver exist in user-mode or kernel-mode. A mini-driver writer can test the core functionality while in user-mode, and take advantage of the Visual C++ IDE for debugging. Later, the mini-driver can be pushed into the kernel, and interrupt-driven operations and messaging can be tested.

One method for creating a mini-driver is through a proxy mechanism. The proxy mechanism first tries to create the mini-driver in the kernel. If successful, a pointer is returned, wherein the pointer is not to an actual mini-driver, but to a proxy class that routes calls down to the kernel, where the mini-driver exists. If creation of the mini-driver fails in kernel-mode, the proxy code attempts to create the mini-driver in user-mode. If successful, a pointer is returned to the actual instance of the mini-driver, and communication is performed with the mini-driver directly.

Thus development of a mini-driver can be performed in user mode, and the completed mini-drivers can then be moved to kernel mode. This is possible because the bus object, buffer object, DMA code, STC Manager, and other services are callable from both user-mode and kernel-mode.

Iterators and the Buffer Object

Figure 10:
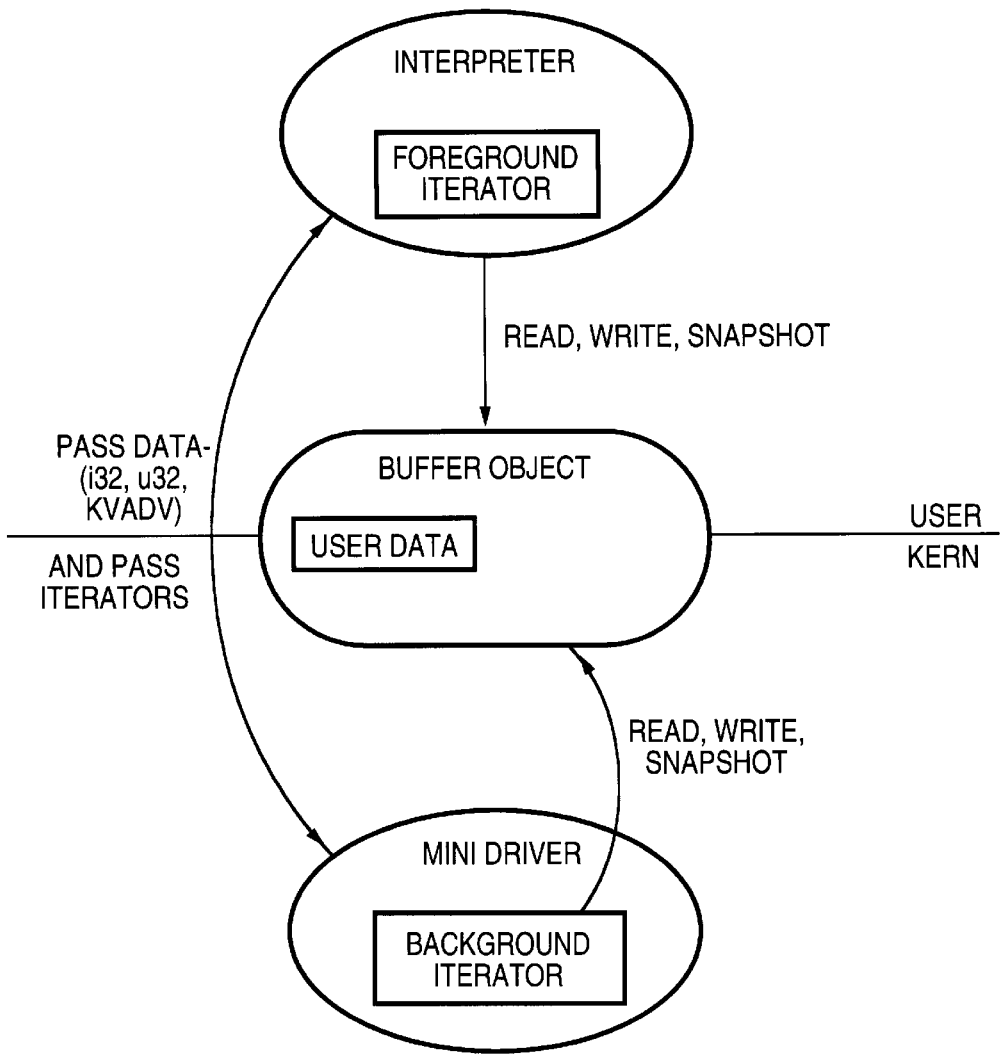
FIG. 10 illustrates the relationship between a mini-driver and the buffer object.

The Buffer Object is a software object created to make data movement from user buffers to the DAQ Device easier and consistent between devices. FIG. 10 illustrates the relationship between mini-drivers and the buffer object. The interpreter creates a buffer object, which can use an existing, user-allocated buffer, or can allocate the buffer itself The interpreter then creates an iterator for the mini-driver to use, and possibly another iterator for its own use.

Example: When doing double-buffered analog input, the mini-driver will read data from the AI FIFO, and using its iterator, write data to the circular buffer (the box labeled 'user data' in FIG. 10). The interpreter will use its iterator to read data out of the circular buffer. An overwrite error can be detected by the mini-driver iterator when a write is attempted. The write iterator will bump up against the read head, and recognize that the user has failed to read data out of the circular buffer fast enough. The mini-driver could shut down the acquisition, noting the reason (an overwrite error). Of course the iterator can also be told to ignore such issues and just write data to the circular buffer regardless of the position of the read head.

The buffer object is mainly used to move data to and from user buffers, but can also be used internally to move other data, such as a set of calibration constants, or the MUX gain entries for AI Scanning. This helps overcome the limited mini-driver interface that only allows standard data types to be sent from the interpreter to the primitives.

Example: WFM Group Control (Start)

This example demonstrates many interpreter, mini-driver, and buffer object concepts.

```
tStatus AOWFMInterpreter::WFMStart (const i16 group)
{
    tStatus err = noError;
    i16 grpIndex = group -1; // This makes indexing easier, since groups start with 1
    u32  i;
    mdVal cookedDataTransferMethod;
    // Lock the WFMEngine for this group, and all the AO channels in this group
    // Everything is unlocked in the Stop call.
    err = cWFMEnginePtr[grpIndex]->Lock ();
    if (err != noError)
        return groupBusyError;
    err = LockTheseChannels (chansToStartBitmap[grpIndex]);
    if (err != noError) {
        // unlock the WFMEngine
        DaqErrAssert (cWFMEnginePtr[grpIndex]->Unlock());
        return chanBusyError;
    }
    err = groupBuffer[grpIndex]->CreateIteratorForMini-driver
        (cookedDataTransferMethod);
    if (err != noError)
        return err;
    // If double buffering is on for the group, we need to create a write iterator.
    if (DBOn[grpIndex]) {
        err = groupBuffer[grpIndex]->CreateIteratorForInterpreter ();
        if (err != noError)
            return err;
    }
    // Deal with messaging, as long as we're not doing FIFO-mode waveform
    if (cookedDataTransferMethod != kmdvForeground) {
        err = SetupMessaging (group);
```

```
    if(err != noError) {
        ClearMessaging (group); // intentionally do not look at error
        return err;
    }
}
//*************************************************
// Send lots and lots of attributes down to the mini-driver
//*************************************************
cWFMEnginePtr[grpIndex]->Set(kmdaWhatToDo, groupBuffer[grpIndex]->mode ?
                kmdvFIFOModeWaveform : kmdvWaveformGeneration);
cWFMEnginePtr[grpIndex]->Set(kmdaChannelBitmap, chansToStartBitmap[grpIndex]);
// Set Transfer Method (IRQ, DMA, Foreground) and FIFO information
cWFMEnginePtr[grpIndex]->Set(kmdaDataTransferMethod, cookedDataTransferMethod);
cWFMEnginePtr[grpIndex]->Set(kmdaDataTransferCondition, groupFIFOInfo[grpIndex]->
    GetAppropriateDataTransferCondition (cookedDataTransferMethod));
// Set buffer information and iterator
cWFMEnginePtr[grpIndex]->Set(kmdaBufferIterations, groupBuffer[grpIndex]->iterations);
cWFMEnginePtr[grpIndex]->Set(kmdaPosttriggerCount,           groupBuffer[grpIndex]-
>bufferPoints);
err = cWFMEnginePtr[grpIndex]->SetIterator (groupBuffer[grpIndex]->rIteratorPtr);
// Set update clock information
cWFMEnginePtr[grpIndex]->Set(kmdaBigBenClockSource,
                groupClockInfo[grpIndex].clockSource);
cWFMEnginePtr[grpIndex]->Set(kmdaBigBenClockInterval,
                groupClockInfo[grpIndex].clockInterval);
// Set timebase information
cWFMEnginePtr[grpIndex]->Set(kmdaBigBenTimebaseSource,
                groupClockInfo[grpIndex].timebaseSource);
if (groupClockInfo[grpIndex].timebaseSource == kmdvInternalTimebase)
    cWFMEnginePtr[grpIndex]->Set(kmdaBigBenTimebaseFrequency,
                groupClockInfo[grpIndex].timebaseFrequency);
// Send messaging info down to the mini-driver
cWFMEnginePtr[grpIndex]-> Set(kmdaRunMessaging, runMessaging);
cWFMEnginePtr[grpIndex]-> Set(kmdaEndMessaging, endMessaging);
if (runMessaging == kmdvOn)
    cWFMEnginePtr[grpIndex]-> Set(kmdaRunMessagePtr, (void*) &messageRunBlockRef);
if (endMessaging == kmdvOn)
    cWFMEnginePtr[grpIndex]-> Set(kmdaEndMessagePtr, (void*) &messageEndBlockRef);
// Indicate whether or not old data stop is on for this group
cWFMEnginePtr[grpIndex]-> Set(kmdaOldDataStop, oldDataStopOn[grpIndex] ?
                kmdvOn : kmdvOff);
if (err == noError)
    err = cWFMEnginePtr[grpIndex]->Control(kmdcStart); // start will call program
return err;
}
```

Interpreter/Mini-Driver/Primitive Construction and Destruction

1. Constructing Mini-Drivers

The devClass is used to create the mini-driver. If the same mini-driver supports several similar devices, all necessary information to distinguish between different devices should be sent down in the constructor to the mini-driver. Because function dispatching would be difficult if everyone's mini-driver constructor was different, a common method is used to pass down constructor information Example of suggested constructor:

```
ESeriesMini-driver
(
    u32 deviceNumber,
    void* myConstructorInfoPtr,
    u32 sizeOfMyConstructorInfo,
    tStatus *constructorError
);
```

A header file should be created and placed in a min-driver directory, and both the mini-driver and the device class will include this header file. A structure should also be created to hold constructor information. For example, the following is a file used for the E Series mini-driver.

```
#ifndef ___intmdshr_h___
#define ___intmdshr_h___
struct tESeriesMini-driverConstructorInfo {
    u32 numChannels;
    u32 numEngines;
};
#endif ___intmdshr_h___
```

The code that creates the mini-driver uses the type tESeriesMini-driverConstructorInfo.

2. Constructing Primitives

Primitives are constructed only by mini-drivers, and free to pass the frictions. The user is free to pass the necessary information to the primitive simply by adding extra parameters to the constructor. Examples:

```
AOChannel
(
    mdMini-driver& mini-driver,
    ESeriesToolBox& tb,
    u32 chanNum, // So I know what channel I am!
    tStatus *constructorError
);
```

-continued

```
WFMEngine
(
    mdMini-driver& mini-driver,
    ESeriesToolBox& tb,
    u32 engineNum,   // So I know what engine I am!
    u32 maxNumChans, // So I know how many channels I can use
    tStatus *constructorError
);
```

In the preferred embodiment, all primitives take a parameter such as constructorError as shown above. This is important to provide a way to recognize when a primitive has failed to construct properly.

Constructing Primitives On-The-Fly (Only As Needed)

In the currently preferred embodiment, when a mini-driver is created, all of the primitives are created, whether or not they will be needed. In another embodiment, primitives are only created when necessary. For example, if a user has a National Instruments AT-MIO-16E-2, and only wanted to use the digital lines, in this embodiment the AI, AO or CTR mini-driver primitives are never instantiated. When the user configures a croup (digital, AO, AI, or CTR), the necessary primitives are created at that time. In this embodiment, information that is passed in to the primitives at construction time is stored somewhere in the mini-driver, since the creator of the mini-driver probably passed in some information destined for the primitives.

Mini-driver Model

Figure 11:
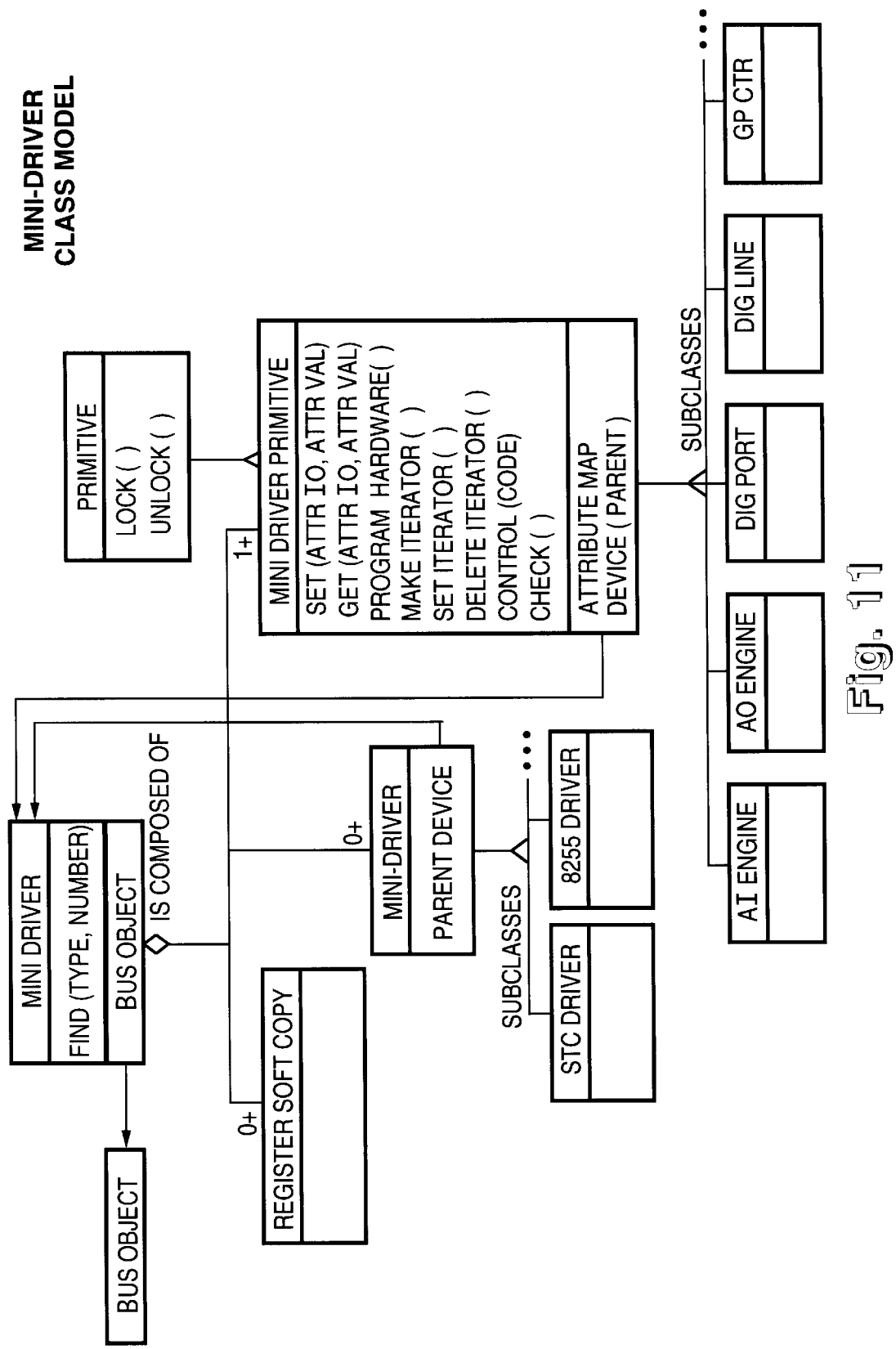
FIG. 11 illustrates the mini-driver class model.

FIG. 11 illustrates the mini-driver class model of the preferred embodiment. The Mini-driver of a device captures the essential low-level device attributes and primitives for a family of devices. Mini-driver Primitives exported by the driver each act as a programmable, independent, functionality specific engine for the driver. (see Figure: Mini-driver Class Model.) A user application compiles a high-level task specification into the programming attributes and control commands on one or more of the primitives exported by the driver.

For each family, the mini-driver provides a centralized class for instantiation of exported primitives and for storing register soft copies and handles to packaged "chip drivers," which control specific chips using the register map for the device. In one embodiment, these register soft copies and handles to chip drivers are stored in a toolbox created by the mini-driver for use by multiple primitives. In another embodiment, this information is stored in the mini-driver itself. For example, chip-drivers are created for the STC (system timer/counter) chip, the 8255 digital port chip, the 8253 and 9513 counter-timer chips, and the 0–8 A/D converter chip used on DMM and Temperature boards, just to name a few. In addition to centralizing register maps and handles to chip-drivers either directly or in an instance of a toolbox, the Mini-driver exports, upon instantiation, the specific primitives used by the higher-level interface to control the device.

Primitives are responsible for exporting programmable attributes and a run-time model for a particular engine or resource on the DAQ device. The interface to primitives is generic, though attributes and behaviors depend on the particular type of primitive exported. Lock() and Unlock() calls manage exclusive access to a primitive. Once reserved, Get(attrID, attrVal) and Set(attrID, attrVal) attribute calls provide the interface for setting up and querying current programmable attributes. A ProgramHardware() call is responsible for enabling the primitive for operation using the current attribute settings. For more sophisticated buffer operations, GetIterator(iterator), and associate with the primitive a pre-configured buffer to use in continuous or multiple-scan operation. Once a buffer is configured and the primitive is started, data can be retrieved through the interface to the pre-configured buffer object.

Advantages of implementing this primitive interface are:

The interface factors out configuration and implementation of operations that cannot be placed in the kernel under NT and interface-dependent but board independent operations, i.e., scaling, messaging on software conditions, advanced buffering behaviors, and SCXI and AMUX configuration.

The primitive interface provides a lower-level, C API independent, interface to a particular operation of a driver. This independence helps future migrations to new APIs.

Primitive reservation is accomplished explicitly and before any programming may take place. This explicit primitive management simplifies DAQ configuration.

The primitive provides a simpler, component-testable interface that can help rapid prototyping and overall development time of new drivers as that work takes advantage of more shared code in primitive base classes.

The generic attribute-based API provides an expandable, family-definable set for the wide variety of supported and future DAQ devices, but without trying to define device-independent and user-level public quality attributes required for a task.

A generic interface to primitives allows efficient creation of primitive proxies for addressing primitives across address spaces.

The attributes for some primitives are already specified in driver components. The "AD_Conv_Type" structure for AI engines on "old boards" is an example of this. (Each family with AI might use a subset of the fields of this structure for an AI Process primitive.)

Different families of devices do not have to export similar attributes, though convenient consistent naming and behavior can help code sharing at the interpreter level.

The interface provides a foundation for implementing a "Direct DAQ" interface in DAQ driver level software.

There is much potential for shared code in base classes of primitives for specific operations, in particular, AI Process, AO Process, Counter, and Digital I/O operations, especially in terms of binding interrupt service routines to DMA, interrupts, and buffers for these operations.

Figure 12:
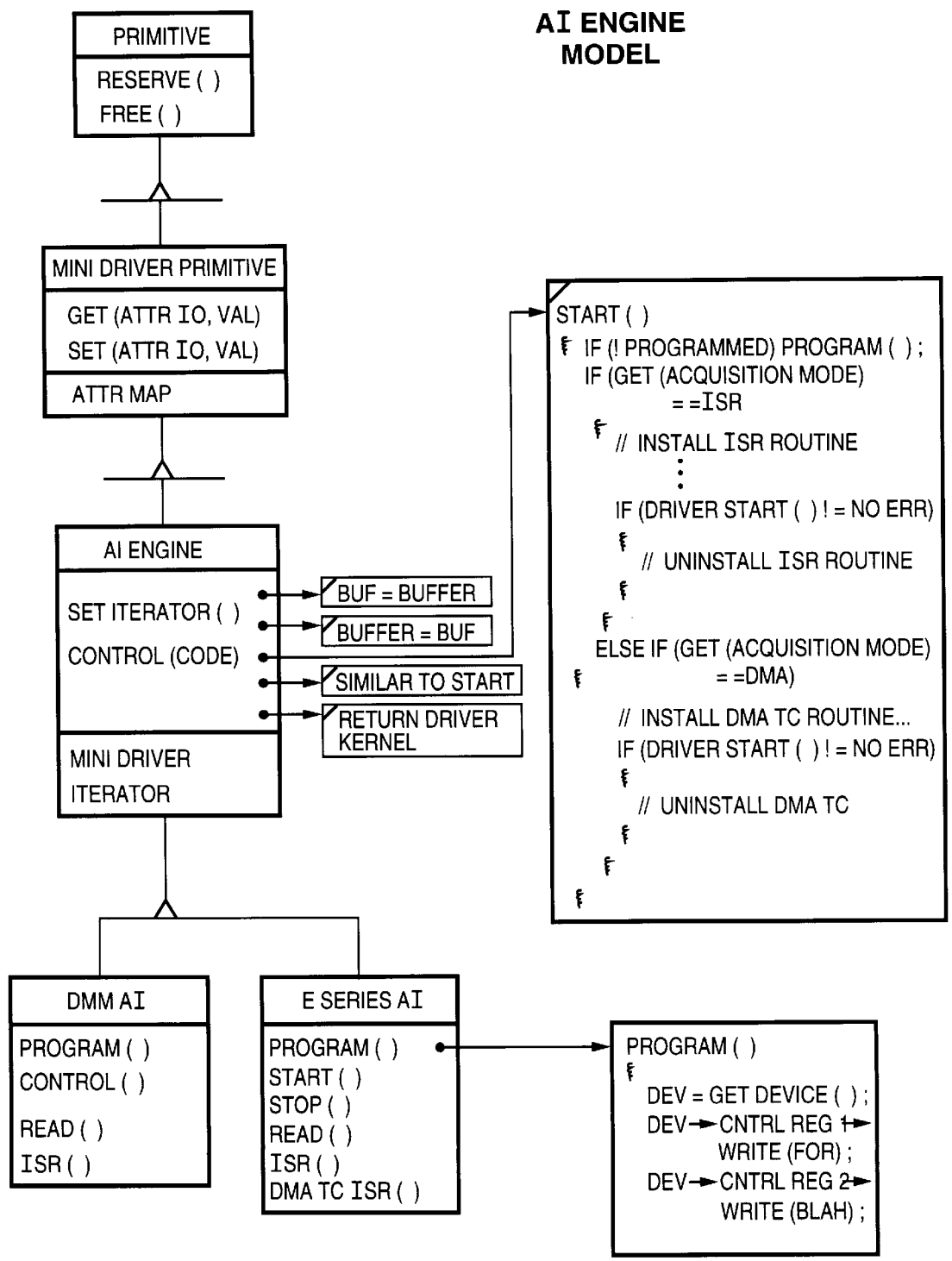
FIG. 12 illustrates the analog input process class model.

Example Primitives and Programming Attributes for an E-Series Product Primitives:
1 E-Series AI Engine
1 E-Series AO Engine
2 GPCTR Engines
1 E-Series Digital Port ( 1 8-bit port)
8 E-Series Digital Lines (viewed as lines)
7 RTSI Connections
E-Series AI Process Attributes:
(examples, many of these are straight from AD_Conv_ Type in file "sysconf.h")
i16 scan_chans[]: channels to scan in mux-gain memory
enum input_mode[]: RSE, NRSE, or DIFF mode for each channel in scan array
enum input_polarity[]: bipolar or unipolar for each channel in scan array
enum input_range: input range for each channel in scan array
enum mux—gains[] gain for each channel
enum acquisition—mode: interrupts, DMA, or 2DMA
bool ext—conv: external convert pulses used
bool ext—trig: external trigger used
bool pre—trig: pretrigger used bool dither: whether dither is on or not
i16 timebase: −1, 1, 2, 3, 4, etc.
u32 channel_hold: number of samples to stay on each channel in scan_chans array
u32 sample_count: number of samples to acquire etc.
Examples Resources and Attributes for the DAQ Card-DMM
Resources:
1 DMM AI Process
1 DMM Digital Port (viewed as 1 eight-bit port)
8 DMM Digital Lines (viewed as lines)
DMM AI Process Attributes:
(examples)
enum input_mode: RSE, NRSE, or DIFF mode for each channel in scan array
enum input_polarity: bipolar or unipolar for each channel in scan array
enum input_range for A/D converter
enum measure_type: resistance or volts
enum acquisition_mode: only interrupts is supported
bool driveCurrentSrc whether to drive the external current source
u32 sample_count: number of samples to acquire etc.
Code Reuse for AI Engine Primitives An AI Engine is a common primitive on many DAQ devices, and code is preferably shared at the base class level due to the complexity of expected behavior and functionality. FIG. 12 illustrates the AI Engine Class Model. Much reuse in terms of AI engine behavior is preferably shared in the buffer implementation. The buffer object encapsulates many of the buffering modes, including n-point, double-buffered, LV continuous operation, and timed non-buffered buffered acquisition. Additionally, configuration and triggering of device independent software messages can be shared at the buffer level. Scaling can be handled above the buffer level, such that the core driver does not have to handle this functionality explicitly.

The base class AI engine performs much of the shared work in terms of binding the interrupt or DMA managers to supported interrupt service routines (ISR's). For instance, the base class preferably defines the existence of certain types of interrupt service routines, for particular modes of acquisition, i.e., point interrupt driven, half-FIFO interrupt driven, or DMA terminal count driven. Depending on the mode when the Start message is sent, the AI engine calls ProgramHardware() if any programming attributes have been changed, queries if the device supports the specified mode of operation, binds the appropriate ISR to the interrupt manager or DMA manager, and subsequently calls the device-dependent EngineStart routine, defined by the derived AI engine class. Upon Stop, the AI Engine removes registration of the interrupt service routine and calls the device-dependent EngineStop() routine.

In one embodiment, the AI Engine base class includes standardized supported attributes for further code reuse.

Interpreting the C API using the Mini-driver Interface

The Mini-driver interface, while being user-level API independent, is able to work with any high-level API exported by DAQ driver level software, such as NI-DAQ. In the Mini-driver model, the interpreter is the module which provides the run-time translation layer from the high-level interface to the low-level interface to different primitives exported from individual mini-drivers.

Figure 13:
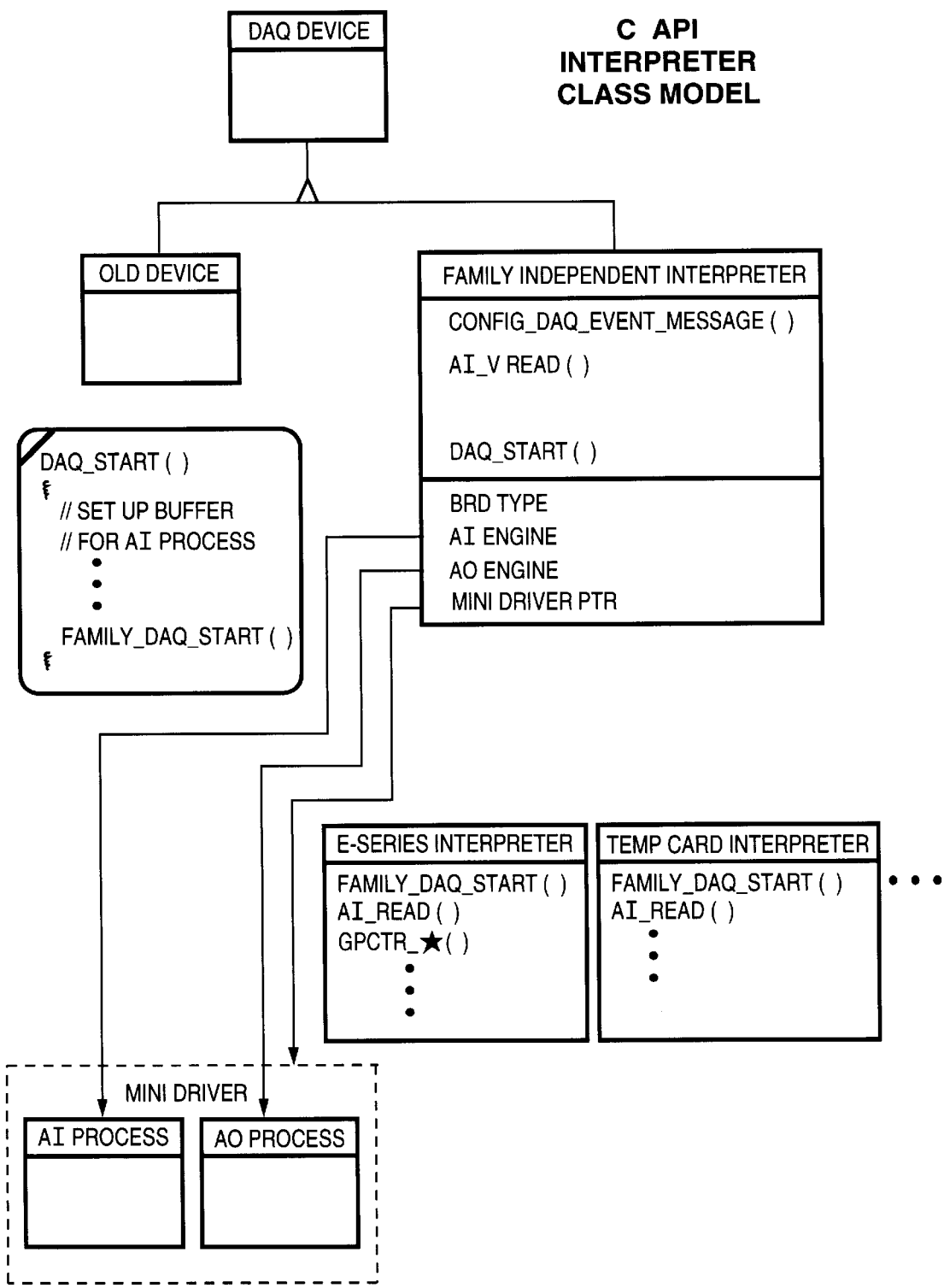
FIG. 13 illustrates the C API interpreter class model.

Mini-drivers export only the low-level programming attributes for a device. However, families of DAQ devices are similar at some level in terms of programming attributes, primitives, and thus functionality supported. Additionally, many features supported by the C API are more or less independent of the particular family supported, including, as mentioned above, software messaging, scaling, and some buffer configuration. Thus, the preferred embodiment includes a shared base class implementation of many of these calls. In many cases, for a particular API function, the shared base class calls the implementation provided by the derived family-specific interpreter. FIG. 13 illustrates the C API Interpreter Class Model.

Code Reuse for SCXI Implementation

Figure 14:
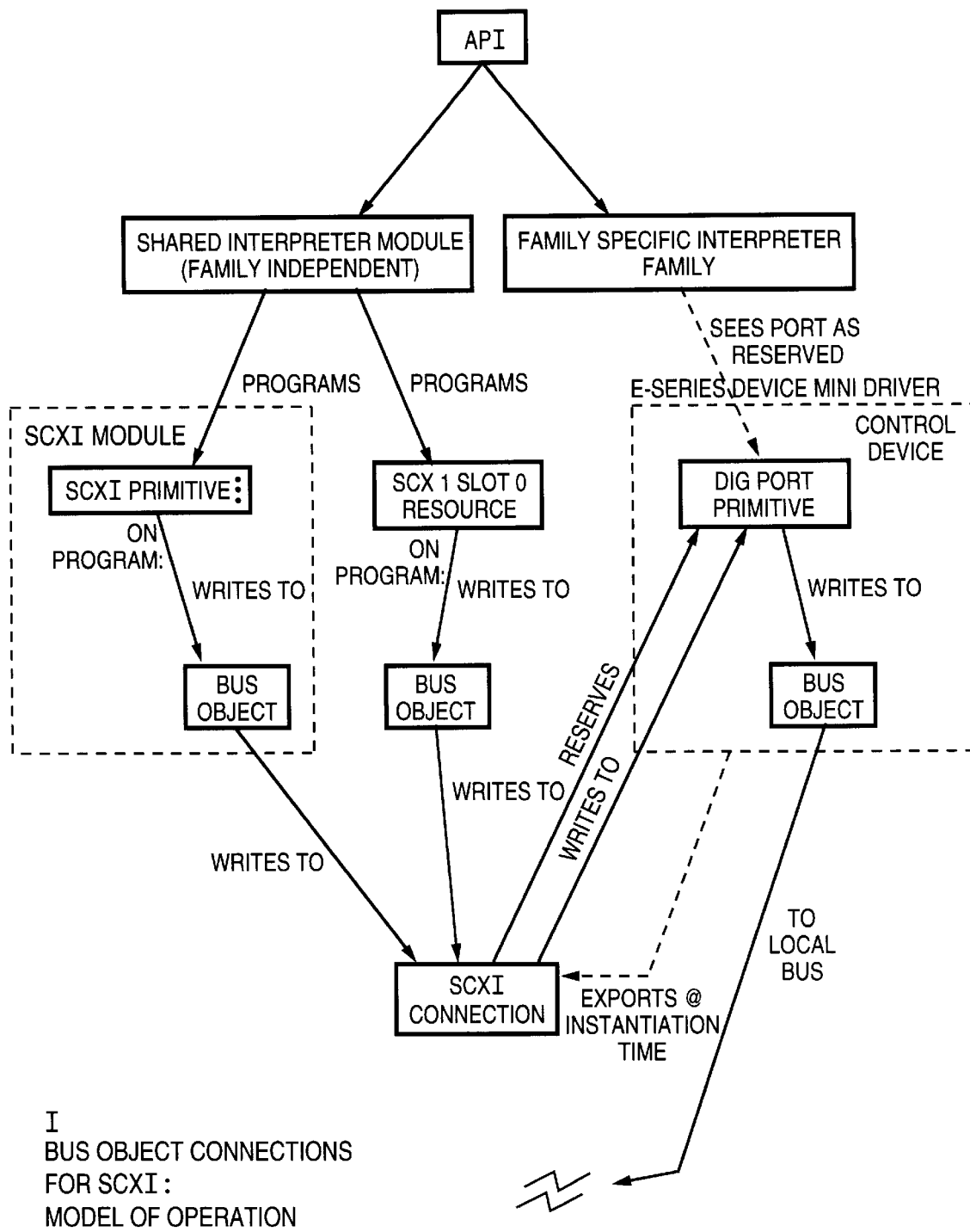
FIG. 14 illustrates the model of operation for I/O Manager Connections for SCXI.
Figure 15:
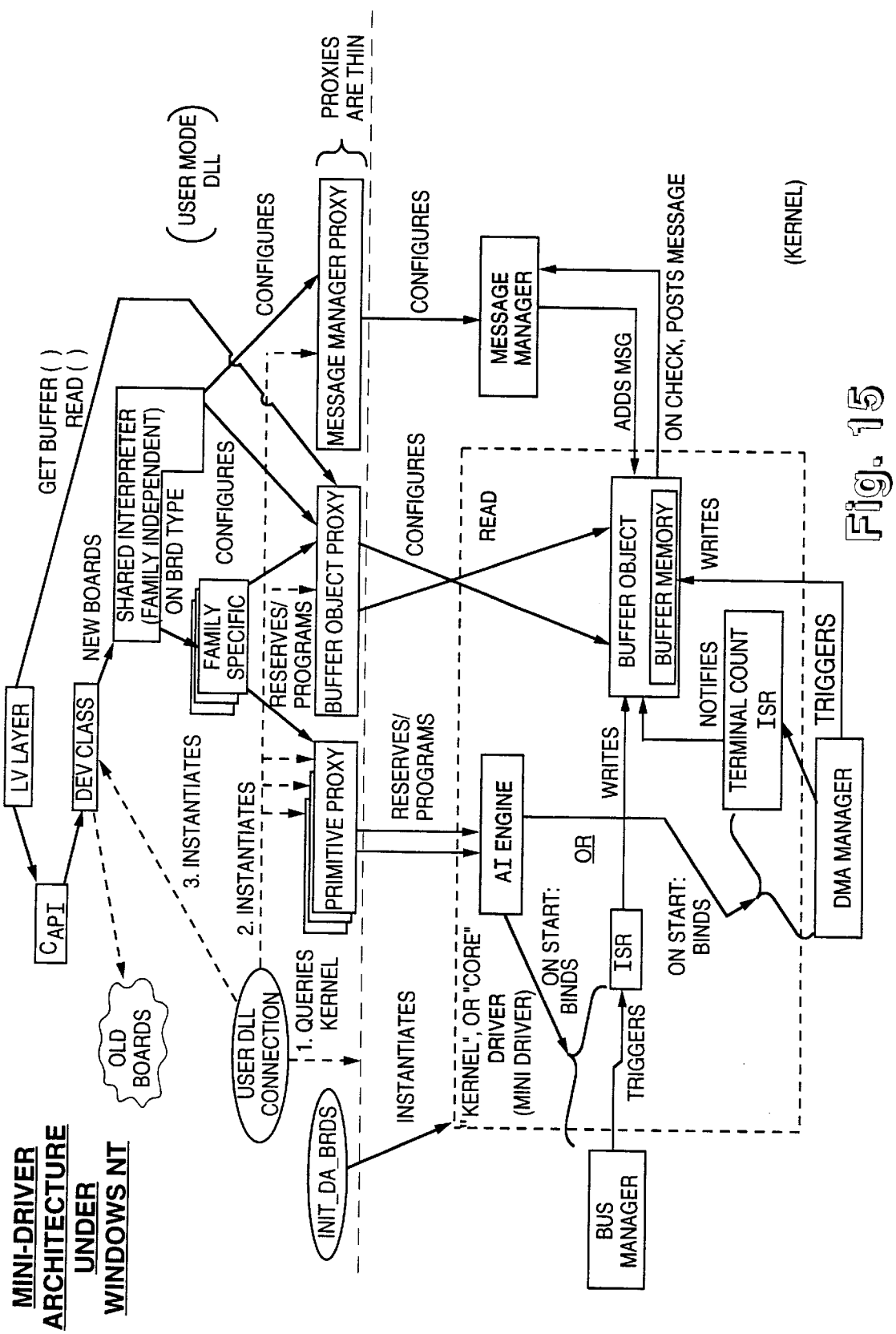
FIG. 15 illustrates the mini-driver architecture under the Windows NT operating system.

In one embodiment, the system includes a family independent SCXI implementation based on a bus object, which operates to hide communications with the SCXI module. FIG. 14 illustrates a model of operation for bus object connections for SCXI Mini-driver Under Windows NT FIG. 15 illustrates a model of operation for the mini-driver architecture under the Windows NT operating system. Resolution of kernel/user mode issues under NT is preferably accomplished by keeping API specific interpreter modules in user mode, while the simpler mini-driver primitives exist and are managed in the kernel. Since scaling and other non-core driver features are factored out from the mini-driver primitives, floating-point and file I/O constraints are eliminated. Communication from user to kernel is accomplished by the instantiation of proxies to a Mini-driver and the associated primitives at connection time for a user DLL. This way, neither the interpreter module code nor the Mini-driver implementation is required to be concerned about the differences in address space. Since the primitive API is consistent and simple among all primitives, a simple, thin, single class can be used to implement the primitive interface proxy to kernel objects.

Figure 16:
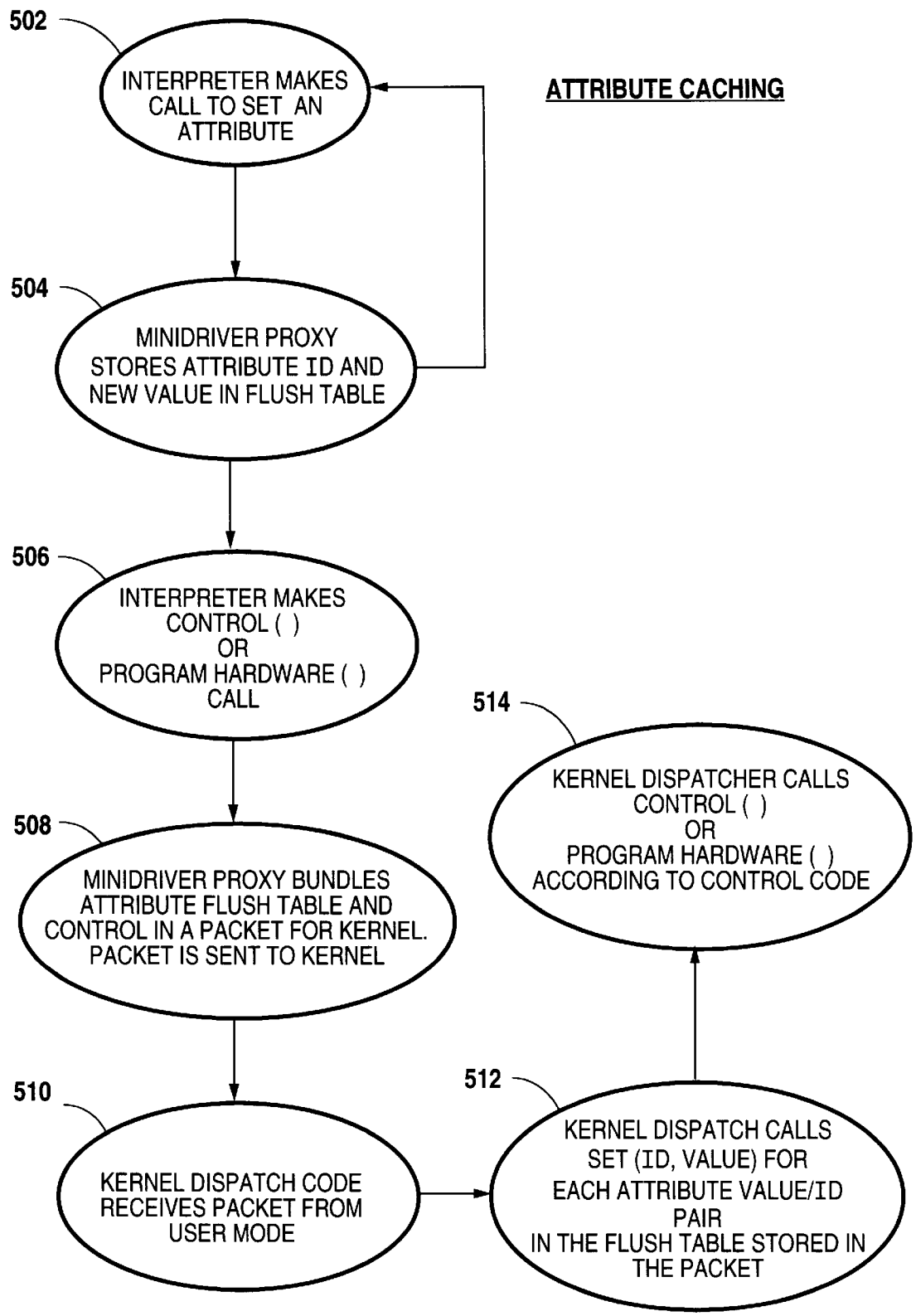
FIG. 16 is a flowchart illustrating attribute caching.
Figure 17:
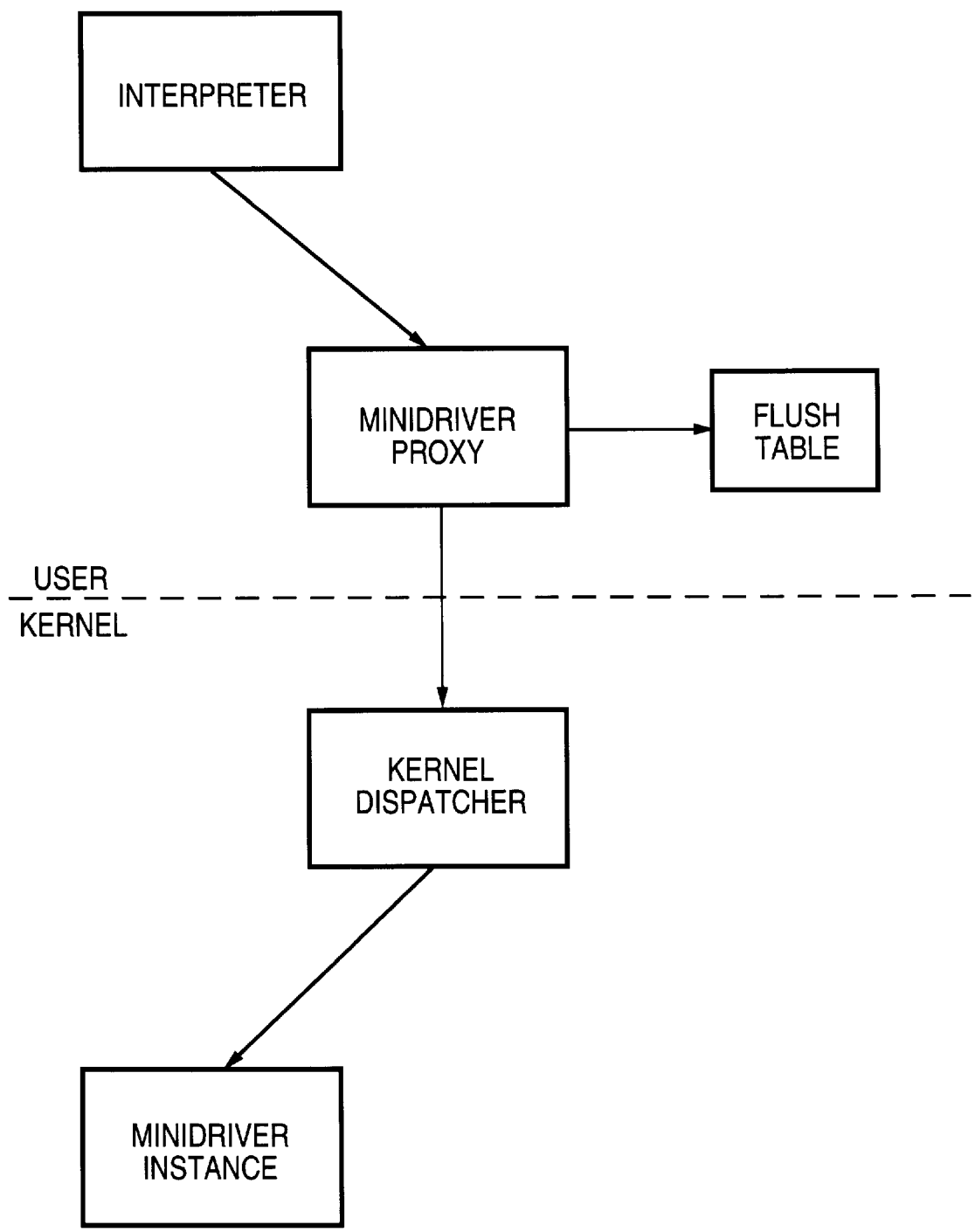
FIG. 17 is a block diagram illustrating various elements involved with attribute caching.

FIGS. 16 and 17—Attribute Caching

FIG. 16 illustrates the operation of attribute caching in the preferred embodiment. More specifically, FIG. 16 is a flowchart illustrating an interpreter setting an attribute, wherein the value of the attribute is cached. As shown, the interpreter first makes a call to set an attribute in step 502. In step 504, the mini-driver proxy stores the attribute id and new value in the flush table (FIG. 17). Thus the new value of the attribute is cached in the flush table. In step 506 the interpreter makes a Control() or Program Hardware() call. In step 508 the mini-driver proxy bundles the attribute flush table and control in a packet for software executing in kernel mode. The packet is then sent to the software executing in kernel mode, i.e., to the kernel dispatcher.

In step 510 the kernel dispatch code receives the packet from user mode. In step 512 the kernel dispatch code calls Set(ID, value) for each attribute value/ID pair in the flush table stored in the packet. In step 514 the kernel dispatcher calls Control or Program Hardware() according to the control code. This makes a call to a mini-driver primitive instance. Operation then completes.

FIG. 17 illustrates the relationship of the elements involved in attribute caching. As shown, the interpreter communicates with the mini-driver proxy which in turn accesses a flush table. Both the interpreter and the mini-driver proxy execute in user mode as shown. The mini-driver proxy communicates to the kernel dispatcher which in turn communicates to the mini-driver instance, i.e., the instance of a mini-driver primitive. As shown, both the kernel dispatcher and the mini-driver instance execute in kernel mode.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A data acquisition (DAQ) system, comprising:
   a computer system including a CPU and a system memory;
   at least one data acquisition (DAQ) device coupled to the computer system, wherein the data acquisition device is operable to generate/receive data;
   a DAQ user application stored in the system memory of the computer system which is executable to perform data acquisition operations in the DAQ system;
   DAQ driver level software stored in the system memory of the computer system which is executable to control the DAQ device, wherein the DAQ driver level software receives calls from the DAQ user application, wherein the DAQ driver level software includes:
      one or more interpreters stored in the system memory of the computer system which receives calls from the DAQ user application, wherein each of the one or more interpreters performs functionality which is common for a plurality of DAQ devices;
      a plurality of mini-driver primitives stored in the system memory of the computer system, wherein each of the mini-driver primitives performs a portion of controlling the DAQ device, wherein each of the plurality of mini-driver primitives are specific to the DAQ device, wherein each of the plurality of mini-driver primitives performs operations to control the DAQ device in response to calls received from the DAQ user application.

2. The DAQ system of claim 1, wherein the DAQ device includes a plurality of hardware resources for performing DAQ functions;
   wherein each of the plurality of mini-driver primitives controls one of said hardware resources.

3. The DAQ system of claim 2, wherein said plurality of resources include an analog input, an analog output a digital port, a waveform generator, and a counter;
   wherein the plurality of mini-driver primitives include an analog input channel primitive, an analog output channel primitive, a digital port primitive, a waveform engine primitive, and a counter engine primitive.

4. The DAQ system of claim 1, wherein each of the one or more interpreters is operable to generate one or more calls to each of a plurality of the plurality of the mini-driver primitives in response to a received call from the DAQ user application;
   wherein each of the plurality of mini-driver primitives performs operations to control the DAQ device in response to calls from the one or more interpreters.

5. The DAQ system of claim 1, wherein each of the one or more interpreters are useable for a plurality of different DAQ devices.

6. The DAQ system of claim 1, further comprising:
   a DAQ device object stored in the system memory of the computer system which receives calls from the DAQ user application, wherein the DAQ device object corresponds to the DAQ device, wherein the DAQ device object is executable to create each of the plurality of mini-driver primitives, wherein the DAQ device object is also executable to create each of the one or more interpreters;
   a device class stored in the system memory of the computer system, wherein the DAQ device object is created from the DAQ device class based on the type of DAQ device comprised in the DAQ system.

7. The DAQ system of claim 1, further comprising a mini-driver stored in the system memory of the computer system which is executable to create said mini-driver primitives.

8. The DAQ system of claim 1, further comprising:
   wherein each of the mini-driver primitives present the same application programming interface.

9. The DAQ system of claim 1, wherein each of the one or more interpreters performs one or more of the following functions: buffering, messaging which does not require board programming, setting up SCXI and AMUX attachments to the device, performing parameter validation on incoming function parameters and scaling to engineering units.

10. A method for controlling a data acquisition (DAQ) device in a DAQ system, wherein the DAQ system comprises a computer system including a CPU and a system memory, and at least one data acquisition (DAQ) device coupled to the computer system, wherein the data acquisition device is operable to generate/receive data the method comprising:
    a DAQ user application executing in the computer system generating a call to perform data acquisition operations in the DAQ system;
    an interpreter executing in the computer system receiving the call from the DAQ user application;
    the interpreter performing DAQ driver level functions in response to receiving the call from the DAQ user application, wherein the interpreter performs functionality which is common for a plurality of DAQ devices;
    the interpreter generating calls to a plurality of mini-driver primitives in response to receiving the call from the DAQ user application;
    the plurality of mini-driver primitives each performing a portion of controlling the DAQ device, wherein each of the plurality of mini-driver primitives are specific to the DAQ device, wherein each of the plurality of mini-driver primitives perform operations to control the DAQ device in response to calls received from the interpreter.

11. The method of claim 10, wherein the DAQ device includes a plurality of hardware resources for performing DAQ functions;
    wherein the plurality of mini-driver primitives each performing a portion of controlling the DAQ device comprises each of the plurality of mini-driver primitives controlling one of said hardware resources.

12. The method of claim 10, wherein said plurality of resources include an analog input, an analog output, a digital port, a waveform generator, and a counter;
    wherein the plurality of mini-driver primitives include an analog input channel primitive, an analog output channel primitive, a digital port primitive, a waveform engine primitive, and a counter engine primitive.

13. The method of claim 10, wherein the interpreter generates one or more calls to each of the plurality of mini-driver primitives in response to the received call from the DAQ user application.

14. The method of claim 10, wherein the interpreter is useable for a plurality of different DAQ devices.

15. The method of claim 10, further comprising:
    creating a DAQ device object which corresponds to the DAQ device;

the DAQ device object creating each of the plurality of mini-driver primitives; and the DAQ device object creating the interpreter.

16. The method of claim 10, wherein the DAQ device object creating each of the plurality of mini-driver primitives comprises:

the DAQ device object creating a mini-driver;

the mini-driver creating said mini-driver primitives.

17. The method of claim 10, wherein each of the mini-driver primitives present the same application programming interface.

18. The method of claim 10, wherein the interpreter performing DAQ driver level functions comprises the interpreter performing one or more of the following functions: buffering, messaging which does not require board programming, setting up SCXI and AMUX attachments to the device, performing parameter validation on incoming function parameters and scaling to engineering units.

19. A memory media comprised in a computer system, wherein the computer system is for use in a data acquisition (DAQ) system, the DAQ system including the computer system and at least one data acquisition (DAQ) device coupled to the computer system, wherein the data acquisition device is operable to generate/receive data;

wherein the memory media stores DAQ driver level software which is executable to control the DAQ device, wherein the DAQ driver level software receives calls from a DAQ user application, wherein the DAQ driver level software includes:

one or more interpreters which receives calls from the DAQ user application, wherein each of the one or more interpreters performs functionality which is common for a plurality of DAQ devices;

a plurality of mini-driver primitives, wherein each of the mini-driver primitives performs a portion of controlling the DAQ device, wherein each of the plurality of mini-driver primitives are specific to the DAQ device, wherein each of the plurality of mini-driver primitives performs operations to control the DAQ device in response to calls received from the DAQ user application.

20. The memory media of claim 19, wherein the DAQ device includes a plurality of hardware resources for performing DAQ functions;

wherein each of the plurality of mini-driver primitives controls one of said hardware resources.

21. The memory media of claim 19, wherein said plurality of resources include an analog input, an analog output, a waveform generator, and a counter;

wherein the plurality of mini-driver primitives include an analog input channel primitive, an analog output channel primitive, a digital port primitive, a waveform engine primitive, and a counter engine primitive.

22. The memory media of claim 19, wherein each of the one or more interpreters is executable to generate one or more calls to each of a plurality of the plurality of the mini-driver primitives in response to a received call from the DAQ user application;

wherein each of the plurality of mini-driver primitive performs operation to control the DAQ device in response to calls from the one or more interpreters.

23. The memory media of claim 19, wherein each of the one or more interpreters are useable for a plurality of different DAQ devices.

24. The memory media of claim 19, further comprising:

a DAQ device object stored on the memory media which receives calls from the DAQ user application, wherein the DAQ device object corresponds to the DAQ device, wherein the DAQ device object is executable to create each of the plurality of mini-driver primitives, wherein the DAQ device object is also executable to create each of the one or more interpreters;

a device class stored on the memory media, wherein the DAQ device object is created from the DAQ device class based on the type of DAQ device comprised in the DAQ system.

25. The memory media of claim 19, wherein each of the mini-driver primitives present the same application programming interface.

26. The DAQ system of claim 1, wherein each of the mini-driver primitives is specific to a register set of one or more DAQ devices.

27. The method of claim 10, wherein each of the mini-driver primitives is specific to a register set of one or more DAQ devices.

28. The memory media of claim 19, wherein each of the mini-driver primitives is specific to a register set of one or more DAQ devices.

29. A system with an improved driver architecture, comprising:

a computer system including a CPU and a system memory;

at least one device coupled to the computer system, wherein the device includes a plurality of hardware resources for performing functions;

a user application stored in the system memory of the computer system which is executable to perform operations in the system;

driver level software stored in the system memory of the computer system which is executable to control the device, wherein the driver level software receives calls from the user application, wherein the driver level software includes:

one or more interpreters stored in the system memory of the computer system which receives calls from the user application, wherein each of the one or more interpreters performs functionality which is common for a plurality of devices;

a plurality of mini-driver primitives stored in the system memory of the computer system, wherein each of the mini-driver primitives performs a portion of controlling the device, wherein each of the plurality of mini-driver primitives controls at least one of said hardware resources, wherein each of the plurality of mini-driver primitives performs operations to control the device in response to calls received from the user application.

30. The system of claim 29, wherein each of the plurality of mini-driver primitives are specific to the device.

31. The system of claim 29, wherein each of the plurality of mini-driver primitives are specific to a register set of one or more devices.

32. The system of claim 29, wherein said plurality of resources include an analog input, an analog output, a digital port, and a counter;

wherein the plurality of mini-driver primitives include an analog input channel primitive, an analog output channel primitive, a digital port primitive, and a counter primitive.

33. The system of claim 29, wherein each of the one or more interpreters is operable to generate one or more calls to each of a plurality of the plurality of the mini-driver primitives in response to a received call from the user application;

wherein each of the plurality of mini-driver primitives performs operations to control the device in response to calls from the one or more interpreters.

34. The system of claim 29, further comprising:

wherein each of the mini-driver primitives present the same application programming interface.

35. The system of claim 29, wherein each of the one or more interpreters performs one or more of the following functions: buffering, messaging which does not require board programming, setting up attachments to the device, performing parameter validation on incoming function parameters, and scaling.

36. A method for controlling a device in a system, wherein the system comprises a computer system including a CPU and a system memory, and at least one device coupled to the computer system, wherein the device includes a plurality of hardware resources, the method comprising:

a user application executing in the computer system generating a call to perform operations in the system;

an interpreter executing in the computer system receiving the call from the user application;

the interpreter performing driver level functions in response to receiving the call from the user application, wherein the interpreter performs functionality which is common for a plurality of devices;

the interpreter generating calls to a plurality of mini-driver primitives in response to receiving the call from the user application;

the plurality of mini-driver primitives each performing a portion of controlling the device, wherein the plurality of mini-driver primitives each control one of said hardware resources, wherein each of the plurality of mini-driver primitives perform operations to control the device in response to calls received from the interpreter.

37. The method of claim 36, wherein each of the plurality of mini-driver primitives are specific to the device.

38. The method of claim 36, wherein each of the plurality of mini-driver primitives are specific to a register set of one or more devices.

39. The method of claim 36, wherein said plurality of resources include an analog input, an analog output, a digital port, and a counter;

wherein the plurality of mini-driver primitives include an analog input channel primitive, an analog output channel primitive, a digital port primitive, and a counter engine primitive.

40. The method of claim 36, wherein the interpreter generates one or more calls to each of the plurality of mini-driver primitives in response to the received call from the user application.

41. The method of claim 36, wherein each of the mini-driver primitives present the same application programming interface.

42. The method of claim 36, wherein the interpreter performing driver level functions comprises the interpreter performing one or more of the following functions: buffering, messaging which does not require board programming, setting up attachments to the device, performing parameter validation on incoming function parameters, and scaling.

43. A memory media comprised in a computer system, wherein the computer system is for use in a system, the system including the computer system and at least one device coupled to the computer system, wherein the device includes a plurality of hardware resources;

wherein the memory media stores driver level software which is executable to control the device, wherein the driver level software receives calls from a user application, wherein the driver level software includes:

one or more interpreters which receives calls from the user application, wherein each of the one or more interpreters performs functionality which is common for a plurality of devices;

a plurality of mini-driver primitives, wherein each of the mini-driver primitives performs a portion of controlling the device, wherein each of the plurality of mini-driver primitives controls one of said hardware resources, wherein each of the plurality of mini-driver primitives performs operations to control the device in response to calls received from the user application.

44. The memory media of claim 43, wherein each of the plurality of mini-driver primitives are specific to the device.

45. The memory media of claim 43, wherein each of the plurality of mini-driver primitives are specific to a register set of one or more devices.

46. The memory media of claim 43, wherein said plurality of resources include an analog input, an analog output, a digital port, and a counter;

wherein the plurality of mini-driver primitives include an analog input channel primitive, an analog output channel primitive, a digital port primitive, and a counter engine primitive.

47. The memory media of claim 43, wherein each of the one or more interpreters is executable to generate one or more calls to each of a plurality of the plurality of the mini-driver primitives in response to a received call from the user application;

wherein each of the plurality of mini-driver primitives performs operations to control the device in response to calls from the one or more interpreters.

48. The memory media of claim 43, wherein each of the mini-driver primitives present the same application programming interface.

* * * * *

UNITED STATES PATENT AND TRADEMARK OFFICE
CERTIFICATE OF CORRECTION

PATENT NO. : 5,926,775
DATED : July 20, 1999
INVENTOR(S) : Brumley et al.

It is certified that error appears in the above-identified patent and that said Letters Patent is hereby corrected as shown below:

Claim 21, col. 29, line 48, please insert "a digital port," immediately after "an analog output,".

Signed and Sealed this

Fourteenth Day of December, 1999

Attest:

Attesting Officer

Q. TODD DICKINSON

Acting Commissioner of Patents and Trademarks